United States Patent

[11] 3,603,879

| [72] | Inventors | Edmond R. Pelta<br>Pacific Palisades;<br>Kenneth Stewart Gold, Canoga Park, both of, Calif. |
|---|---|---|
| [21] | Appl. No. | 37,533 |
| [22] | Filed | May 15, 1970<br>Division of Ser. No. 556,710, June 10, 1966 |
| [45] | Patented | Sept. 7, 1971 |
| [73] | Assignee | Autoscan, Inc.<br>Culver City, Calif. |

[54] APPARATUS FOR MEASURING THE FREQUENCY OF OCCURENCE OF IGNITION SIGNALS IN A MULTICYLINDER ENGINE
22 Claims, 20 Drawing Figs.

[52] U.S. Cl. .................................................. 324/161, 324/169, 324/15, 73/117.3
[51] Int. Cl. ................................................. G01p 3/56
[50] Field of Search........................................... 324/69, 70, 78, 131, 15, 16, 19; 73/116–118; 340/263

[56] References Cited
UNITED STATES PATENTS
| 2,562,913 | 8/1951 | Heeren.......................... | 324/78 |
| 2,572,788 | 10/1951 | Weighton...................... | 324/78 |
| 2,921,260 | 1/1960 | Crandon........................ | 324/78 |

Primary Examiner—Michael J. Lynch
Attorney—Smyth, Roston & Pavitt

ABSTRACT: A ramp voltage is provided to a particular amplitude upon each occurrence of an ignition signal for a cylinder in a multicylinder engine. The slope of the ramp voltage is changed as the rate of occurrence of the ignition signals in the multicylinder engine varies. When the amplitude of the ramp voltage reaches the particular level, the ramp voltage is terminated until the occurrence of the next ignition signal. A sweep is produced in accordance with the ramp voltage.

When the frequency or angular velocity of the multicylinder engine is to be tested, the ramp voltage is produced at the same slope as in the previous paragraph. However, the ramp voltage is produced to a level dependent upon the rate of occurrence of ignition signals. The level of this ramp voltage indicates the rate of occurrence of the ignition signals. The level of the ramp voltage is also measured in each cycle of sequential firing of the multiple number of cylinders, upon a failure of a particular one of the cylinders to fire in each cycle, to indicate the speed of the engine.

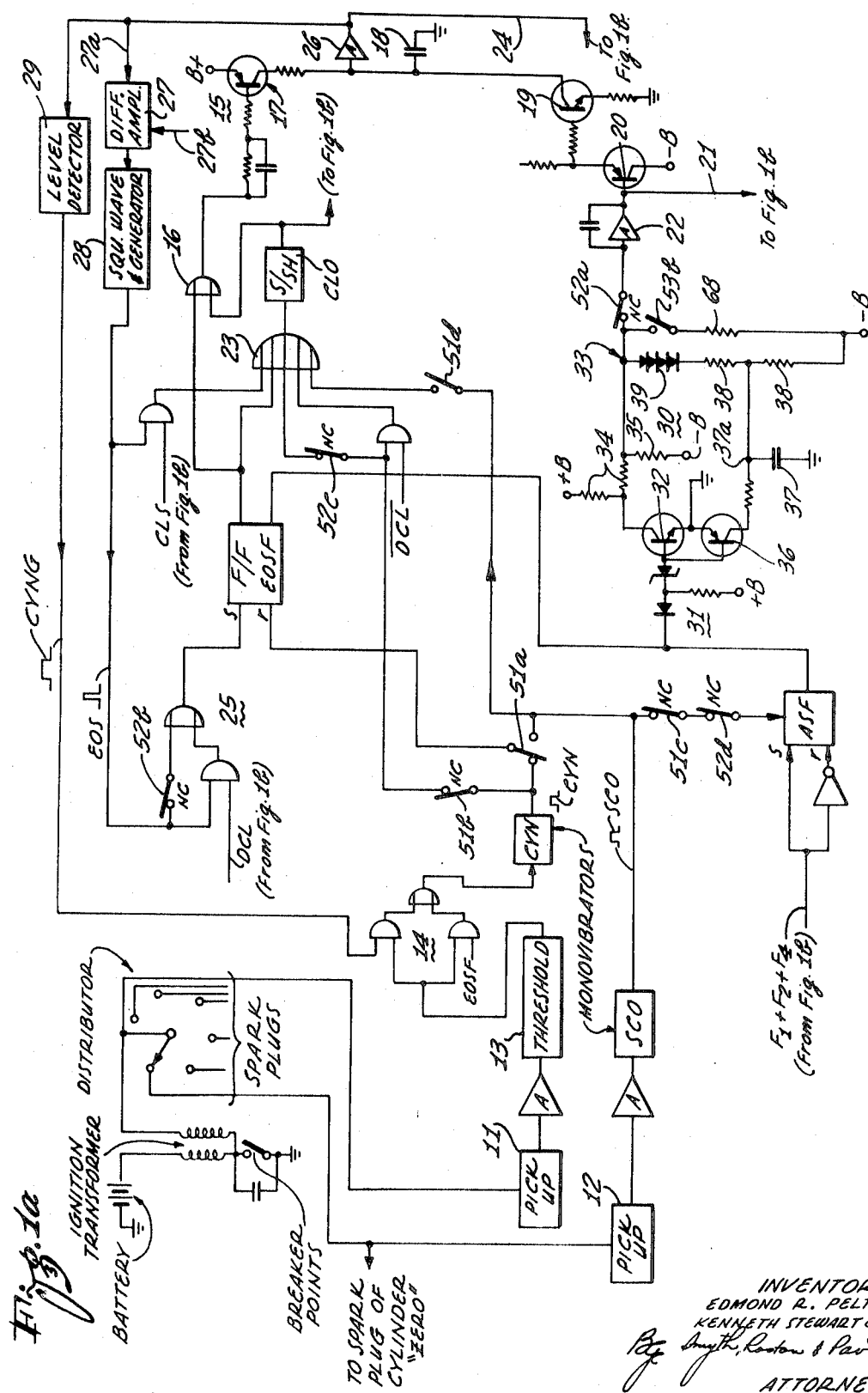

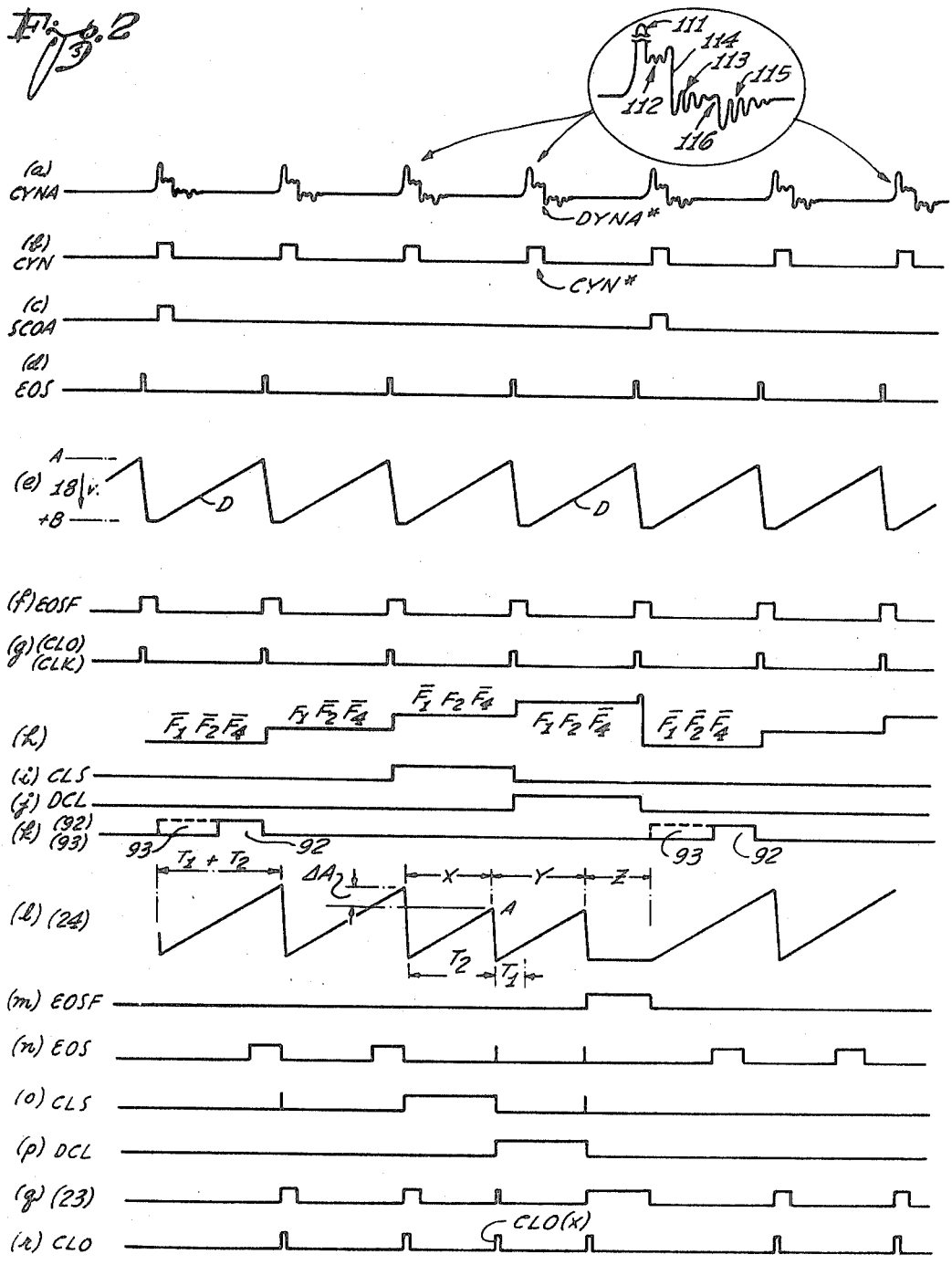

APPARATUS FOR MEASURING THE FREQUENCY OF OCCURENCE OF IGNITION SIGNALS IN A MULTICYLINDER ENGINE

This is a division of application Ser. No. 556,710 filed June 10, 1966.

The present invention relates to a circuit for processing analog signals, particularly of the type which recur at a rate of variable frequency. The invention is particularly concerned with a circuit which permits the extraction of a large amount of useful information from such a signal train. Without intending to restrict the scope of the application it is useful to explain many aspects of the invention in relation to a circuit which permits investigation of configuration, behavior and effect of the ignition pulses for a combustion engine having multiple cylinders. Useful information to be extracted by such an investigation includes the waveform of all ignition pulses of the engine and of the ignition pulses for a particular cylinder having been selected among the several cylinders. Useful information includes further the observation of the phase and frequency behavior of these pulses, as phase is indicative of ignition time and frequency is indicative of the speed of the engine. Herein it is particularly of interest to determine what change in engine speed occurs if the ignition for a selected one of the cylinders is inhibited.

The circuit network which is the principal object of the present invention includes several portions. A first portion is a self-synchronizing sweep generator for providing the time base or horizontal sweep of an oscilloscope whereby slope and recurrence of the sweep faithfully follows the occurrence of trigger pulses applied to the generator. Another portion is a pulse selecting circuit to keep track of the pulses as they occur and recur. This selection circuit can be used to provide for selected blanking and unblanking of the recording beam in the oscilloscope. Still another portion of the system includes a portion which controls selective suppression of production and/or effectiveness of a pulse. The circuit includes an instrument section which derives from the sweep generator signals indicative of relative changes of the frequency of the trigger pulses; also from the sweep generator one derives signals bearing particular phase relationship to the trigger pulses to provide stroboscopic control signals.

The principal input stage is a circuit element which responds to the recurring analog signal, and here to a particular characteristics thereof to provide a series of representative pulses. This input circuit includes, for example, a threshold circuit to respond only to a particular characteristics of the analog signal. In case of ignition pulses this characteristics may be the main spike of an ignition pulse. A trigger pulse is thus produced each time the ignition signal exceeds a particular amplitude. These trigger signals operate the sweep generator to provide for recurring time base signals, such as a linearly increasing voltage used, for example, to control the horizontal deflection of the oscilloscope.

The time base generator includes control means to render the slope of the sweep adjustable dependent upon the frequency of the trigger signals. This slope is controlled by means of a feedback loop which responds, on one hand, to the trigger signals, and, on the other hand, to the sweep signal itself to provide control signals. Trigger signals and control signals form an error signal in case there occurs a change in frequency, i.e., in the rate of the trigger signals, which in turn represents a change in the rate of the analog signals as they are being produced. This error signal is then used to control the time base generator by changing the slope in a manner which causes a reduction in the error signal, and stable conditions are attained when the error signal is zero.

As long as the frequency of the trigger signals and of the train of analog signals does not change, the slope of time base signal remains constant. The beginning of each sweep signal is phased to each trigger signal, so that one can derive additional, frequency independent phase signals from the sweep, as each amplitude value of the sweep represents a phase angle to the trigger signal.

The feedback loop can be opened, and as a result thereof the time base generator continues to produce time base signals at the same rate as before irrespective of any subsequent changes in frequency of the analog signals and of the trigger signals. This has the effect that the peak value of the sweep signal will change in case of such a change in frequency. The change of this peak value is inversely proportionate to the relative change in frequency and independent from the frequency of signals to which the system was stabilized. Thus, by measuring the changes in the peak or of a corresponding value, it is possible to derive from the sweep signal an indication of the relative change in frequency. Should these analog signals be the ignition signals for a combustion engine, then this value as indicated represents the relative r.p.m. change of the engine.

The sweep signals are to be used to operate the horizontal deflection circuit of an oscilloscope. If the operation is without the selector circuit, and if the oscilloscope, particularly the Y driver thereof receives the analog signals directly, then on the screen one will see all of the waveforms of the various cylinder pulses in a superimposed relationship. For selective display the selector circuit unit is used. This selector circuit includes primarily a counter, for example, an adjustable ring counter, with a cycle frequency equal to the number of, for example, the cylinders in the combustion engine. From a more general point of view the ring counter cycles at a rate corresponding to the number of pulses per recurring pulse groups within the analog signal to be processed.

The counter is advanced in relation to the recurrence of the pulses to be investigated, and a selector switch permits the selection of a particular count number, thereby indirectly selecting a particular pulse within the recurring pulse groups. As the counter operates in a particular phase relationship as well as in frequency synchronism with the trigger pulses which operate the sweep control circuit, one can use the particular count state as selected to derive therefrom the enabling signal to concur with a particular sweep signal and covering a period of time during which a particular analog signal, the leading portion thereof, the main portion and the trailing portion thereof, will occur with certainty. Since such a prospective occurrence can be established with certainty, one can produce a control signal which inhibits production and/or effectiveness of the analog signal so selected. The result of this inhibition operation can then be observed or monitored with the aid of the aforedescribed device which derives a relative frequency deviation from the sweep generator.

As this enabling signal does recur at the rate of the pulse groups it can be used for unblanking the oscilloscope so as to permit display and observance of a particular recurring analog signal within the recurring group. If as aforedescribed the analog signals are fed to the oscilloscope, then only the particular recurring one, for example, again the waveform of the ignition pulses for a particular cylinder is displayed on the screen of the oscilloscope. A change in the count number changes the particular cylinder the ignition signals of which can be so observed.

The counter can also be used in a different manner, in that the count number is converted into an analog signal, and each such signal is maintained during a particular sweep. This analog signal can be used as a bias in vertical direction for the Y driver of the oscilloscope. All of the analog pulses as they are recurring within a pulse group, are fed to the Y driver of the oscilloscope and one can see the entire group in a vertically stacked relation without superimpositioning and with suitable display of all the waveforms along the entire horizontal width of the oscilloscope. In case the analog signals are ignition pulses for a combustion engine, then stacking provides a display for the ignition pulses for each cylinder separately, i.e., only those pulses pertaining to a particular cylinder are superimposed.

The synchronizing circuit can be adjusted to produce a sweep signal once per passage of an entire pulse group. This sweep signal when operating the horizontal deflection of the oscilloscope permits display of the entire group as recurring along the horizontal base line. The aforedescribed vertical stacking has the advantage that for each analog signal the entire horizontal width of the screen of the oscilloscope is available for display, there being, however, a restriction in the vertical. When the sweep signal is derived from the entire pulse group, the entire vertical dimension of the screen is available for each signal, but they are contracted in the horizontal. Since the circuit permits both types of display, the disadvantages of either are eliminated. It is significant, that the sweep signal has a slope directly proportional to the frequency of the input pulses as derived from the analog signal. By means of threshold detectors it is possible to pick particular phases in relation to the characteristics of the analog signals used to form the trigger signal for the sweep generator. For selected threshold levels monitoring the sweep, the phases so selected will remain constant even if the frequency changes.

This can be used in several ways. One way is, that in cooperation with the select counter one can establish frequency independent phase angle from which to begin a sweep during which a particular analog signal is to occur. This was already mentioned above. Another threshold detector monitoring the sweep can be used to provide a trigger signal for a stroboscopic lamp. The lamp will flash at particular frequency independent phase angles relative to the trigger pulses for the sweep generator which may concur with the ignition pulses of a combustion engine. This stroboscopic lamp may then be used to illuminate the timing markers, for example, on the fly wheel or the harmonic balancer of the engine, so that the timing mechanism can be adjusted. The advance of the distributor can be observed directly by changing the engine speed, and by detecting to what extent the threshold detection has to be readjusted as that readjustment is directly proportionate to the phase advance in the distributor.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings, in which:

FIGS. 2a to 2k illustrate pulse and signal shapes plotted against time and in phase alignment of pulses as they occur in several locations of the circuit shown in FIG. 1 during the synchronizing mode but after stabilization has been established; and FIGS 2l to 2r illustrate the pulse and signal shapes in the constant sweep mode during conduction of a power test.

Figure 1B:
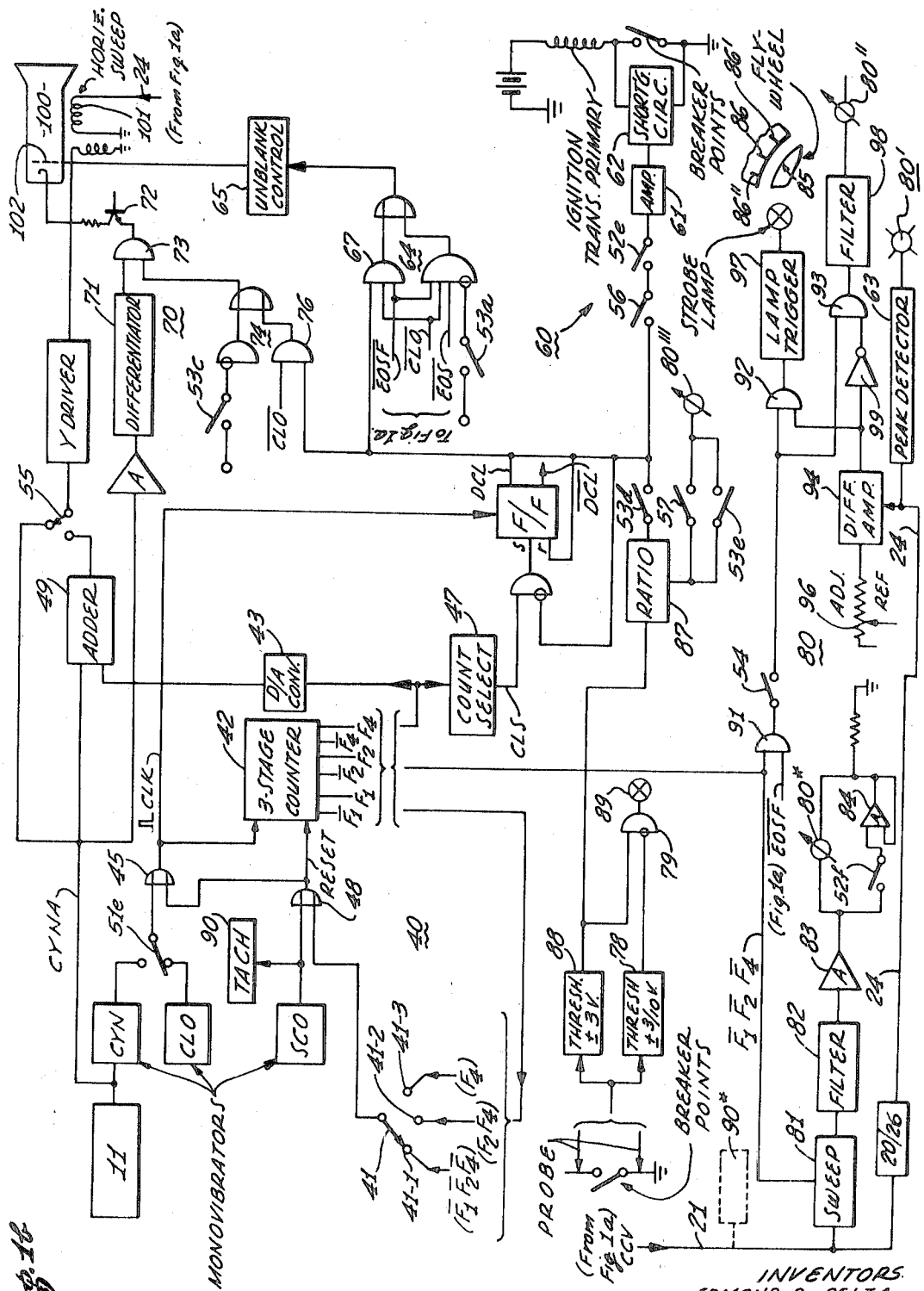
FIG. 1 illustrates in two section, FIGS. 1a and 1b, somewhat schematically a block and circuit diagram of the preferred embodiment of the invention.

Proceeding now to the detailed description of the drawing, in FIG. 1a, there is shown a self-synchronizing sweep generator 10 for controlling an oscilloscope 100 shown in FIG. 1b. FIG. 1b illustrates further a selector unit 40, a pulse inhibitor or suppression unit 60 and a general instrument unit 80. The self-synchronization circuit 10 will be explained first. For reasons of sufficient generality of the system as well as of the preferred use to be made of the present invention, there will be two pulse trains to which the circuit can synchronize. These pulse trains are respectively denoted with CYN and SCO.

The self-synchronization circuit 10 per se does not depend on the representative significance of these pulses. However, within the larger concept of the present invention these pulses are derived from analog signals respectively designated CYNA and SCOA and developed in and by suitable signal generators 11 and 12. These generators may be instruments or measuring transducers. For example, the generator 11 may be a transducer which monitors the voltage across the secondary winding of a transformer in an ignition circuit for a combustions engine and the signals CYNA include the ignition pulses periodically produced by operation of the distributor breaker points. Each pulse is associated with one cylinder, and depending on the number $n$ of cylinders, every $n$th pulse pertains to the same cylinder.

The pulse train CYNA is depicted in FIG. 2a, and it can be seen that each pulse has a very steep leading spike 111 followed by some irregular signals 112. During these signals 112 ignition occurs. The decaying oscillations 113 follow the extinction of the arc at instant 114, while the decaying oscillations 115 following the closing (time 116) of the distributor breaker points of the ignition system of the engine.

The pickup device 12 responds to the ignition pulses as effective for one particular cylinder. Thus, the pickup or probe 12 is coupled to one outlet wire of the distributor, leading to one spark plug to derive therefrom the signals SCOA at a rate equal to the r.p.m. of the engine. This serves merely as a measure to identify the individual cylinders electrically in that this one cylinder now is regarded as cylinder "zero." Thus, one signal CYNA in pickup 11 will coincide with a pulse SCOA, the other ignition signal CYNA follow each other in ascending numeration up to $n-1$.

The signals as provided by the two transducers or probes 11 and 12 are respectively amplified in preamplifiers. The signals CYNA are then fed into a threshold detector 13 which is adjustable for causing a response to spikes 111, 112 and/or 116. The pulses permitted to pass threshold device 13 are used subsequently to trigger a monovibrator CYN; the gate 14 will be disregarded for the moment and is presumed to be open. For the normal case, the spikes 111 will cause the triggering of a monovibrator CYN, because the spike 112 falls into the astable period of monovibrator CYN, while the spikes 116 have the wrong polarity.

The analog signals CYNA are used in the generator 10 only preliminarily for the derivation of trigger signals and pulses CYN. However, the analog signals CYNA are to be applied to the oscilloscope to be displayed, so that the probe 11 is attached to the ignition circuit at a location permitting an exact duplication of the ignition signals. No such requirement exists with regard to the development of signals SCO. Probe or transducer 12 is thus coupled to the spark plug input circuit of the one cylinder and thus responds only to spikes 111. After due amplification the pulses are used to trigger a monovibrator SCO to produce a signal or pulse train of like designation.

The two pulse trains CYN and SCO are applied through a selector or mode switch 51a to the reset input side of a flip-flop EOSF. It should be mentioned, that for implementation it may not be necessary to use a switch such as 51a for connection into the circuit between the monovibrators CYN and SCO and the flip-flop EOSF. Thus, it will be apparent to one skilled in the art that each monovibrator output may be governed by an electronic "and" gate, one "and" gate for each monovibrator, and the respective gating signals are governed by switches. The two "and" gates then have their outputs combined in a logic "or" configuration to provide the resetting signal for flip-flop EOSF. Switch 51a pertains to a mode selector switch symbolically illustrated as having ganged blades 51a to 51e, but in actuality a single switch may govern as many enabling signal lines as there are "and" gates needed for gating.

The circuit is shown in a switching state wherein pulses CYN are the principal output pulses for the generator 10. Signals for setting the flip-flop EOSF are drawn from the output line of an input circuit 25 and receiving input signals in a manner to be described more fully below.

The set side output signal of the flip-flop EOSF, i.e., a signal of like designation, is fed as one input to an "or" gate 23 and from there without additional gating to the input side of a single-shot multivibrator or monovibrator CLO. In particular, a true signal EOSF when produced triggers monovibrator CLO to produce a pulse of short duration, i.e., about 150 microseconds, which pulse bears the same designation and is passed to a switching network 15 through a two-input "or"

gate 16. The alternative input for this "or" gate 16 is directly the signal EOSF. The monovibrator CLO once triggered by the leading edge of a signal EOSF is actually disabled for the duration of the signal EOSF, which may last longer than the astable period of monovibrator CLO.

A "true" or a "false" output signal of "or" gate 16 retains a switching network 15 in one of two switching states. The principal active circuit element for switch 15 is a transistor 17 which when conductive connects a capacitor 18 to a source of positive driving potential B+. For purposes of operating the circuit with the proper signal levels, it may be necessary to connect an inverter between "or" gate 16 and transistor 17. The main point is that transistor 17 is rendered conductive by a "true" output signal from "or" gate 16, which is either the signal EOSF or the signal CLO. The duration of either signal suffices for a complete recharging of capacitor 18 to the potential approximately equal to that of the voltage source, i.e., B+.

When transistor 17 is nonconductive capacitor 17 may discharge through a transistor 19 pertaining to a discharge control circuit 20. The current flow through transistor 19, i.e., the rate of discharge of capacitor 18 is controlled by a voltage potential in a line 21 which voltage signal bears in the following designation CCV, and is the output of an integrator amplifier 22. Due to the characteristics of transistor 19, the collector current thereof will be essentially constant for constant input CCV at line 21. Thus, the rate of discharge of capacitor 18 is constant, so that during capacitor discharge, a linear sweep voltage is developed the slope of which being a function of the voltage CCV in line 21.

A buffer amplifier 26 monitors the voltage across the capacitor 18 and supplies a thus amplified voltage to a line 24. This line 24 is the principal output line of the sweep generator in accordance with the present invention, and this voltage in line 24 serves in most instances for the control of the horizontal sweep circuit of the oscilloscope 100 (FIG. 1b). The development of a suitable and variable sweep control voltage in line 24 for the horizontal sweep control circuit of oscilloscope 100 is one of the main purposes of the inventive device.

The output of buffer amplifier 26 feeds a stabilized amplifier to raise the output to a level more suitable for additional purposes; and this amplifier provides sweep type output signals to one side 27a of a differential amplifier 27 having a fixed, but possibly adjustable bias at its respective other input side 27b, and operating as a peak or level detector. In particular the amplifier 27 provides a particular distinctive signal when the voltage across the capacitor 18 has dropped more due to discharge, from about the level B+ to a level +A or below. For input voltages representative of capacitor voltages above level +A a zero signal, at for example, ground potential is provided by the differential amplifier 27.

The output signal of the differential amplifier 27 is fed to a limiter stage or square wave generator 28 so that actually the output of amplifier 27 is converted into a logic signal which is "true" when differential amplifier 27 responds to charges of capacitor 18 of level +A or below, while the output signal of limiter 28 is regarded as "false" for capacitor charges above +A. This output signal of the limiter 28 is designated as a true signal EOS. Networks 27 and 28 together also form what in the following will be called the EOS detector.

This signal EOS is used for setting the flip-flop EOSF, and it is thus the principal input signal for the network 25, whereby however the latter network permits each signal EOS to set flip-flop EOSF only when a switch 52b is closed. Alternatively, i.e., when switch 52b is open, the flip-flop EOSF will be set from the signal EOS only upon existence of a signal DCL to be developed in a manner to be described more fully below. Switch 52b pertains to a constant sweep mode switch, and all blades of that switch 52a to 52e are in the illustrated position when the system is not in constant sweep mode but in the synchronizing mode. Thus, during synchronization switch 52b is closed and flip-flop EOSF is set by each signal EOS.

The basic function of the monovibrator CLO is to serve as a local, synchronized clock pulse generator and to control the recharge of capacitor 18 concurrently with or in lieu of the control from flip-flop EOSF. The principal trigger signal for the CLO monovibrator is, as stated, the flip-flop EOSF. However, there are certain contingencies which will be developed in detail below and in which the flip-flop EOSF is not being set as a result of a change in operating conditions, for these contingencies other input signals are provided for the "or" gate 23 and thus for the monovibrator CLO.

The first one of these alternative input signals is the signal CYN. It will trigger the monovibrator CLO if the flip-flop EOSF was not set. This will ensure a retrace of the capacitor 18 for those cases, in which the rate was too slow to reach level A, so that signal EOS was not produced at that cycle provided the switch 52C is closed. On the other hand, if level A had been reached, EOS became true to set flip-flop EOSF, then the same pulse CYN which resets EOSF is applied to monovibrator CLO. This merely extends the period of input deactivation of the monovibrator.

As stated the CYN pulse train serves as input for the monovibrator CLO in case the particular operating mode switch 52c is not open. In a manner as was described with reference to the set side input circuit for the flip-flop EOSF, and for the situation when the switch 52c which is operated concurrently with the switch 52b the train pulse CYN can still trigger the monovibrator CLO, provided however the logic signal $\overline{DCL}$ is true; this is the second input for "or" circuit 23.

The third alternative input for "or" gate 23 is the signal SCO which is the second pulse train that can be used for operating the synchronized generator provided switch 51d is closed. This is the case only when the principal input pulse train is provided by the pulses SCO rather than by pulses CYN. In the illustrated case switch 51d is open because a position change of switches 51a, 51b, etc. pertain to a special synchronizing mode and the normal operation uses the pulses CYN.

At this point it may be advisable to mention again that these logic signals such as CYN and SCO may not necessarily be directly governed by switches of the type as switches 51b, 51d, 52c, but there may be provided logic "and" gates having these logic signals such as SCO and CYN as respective signal inputs; separate gating input signals are provided and the gating circuit is then governed by such switches. This way switching noise is kept off those lines which transmit pulses as logic signals. However, for simplifying the illustration and description, these switches are illustrated as being connected directly into the command lines, and the modifications necessary for noise free operations will be apparent to one skilled in the art.

The fifth input of this "or" gate and thus for the CLO monovibrator is the signal EOS, i.e., the output of the EOS detector 27, 28 as was described above, provided a signal CLS is true. The development of this signal will also be described more fully below. This completes the contingencies for the operation of the monovibrator CLO, and it is repeated that for the synchronizing mode monovibrator CLO is triggered by the true signal from the flip-flop EOSF.

Proceeding now to the description of the circuit at the reset output side of the EOSF flip-flop, the signal $\overline{EOSF}$ is fed as a true signal through an input network 30 to the integrator 22. The integrator 22 is a true integrator in that for a stationary output its input must be zero, and its output is proportional to the time integral of the current flowing into or out of its input side. This integrator output voltage was introduced above, and it is the signal CCV which controls the discharge rate of capacitor 18. It will now be described how the flip-flop EOSF controls the input signal for the integrator 22.

The input network 30 has a current limiting input stage 31 which includes a diode and a Zener diode, appropriately biased. The signal $\overline{EOSF}$ when true is a positive signal and is fed through this input stage 31 to the base electrode of an inverting transistor 32. The collector potential of this transistor realizes again the signal EOSF as a positive signal, with $\overline{EOSF}$ being represented by substantially ground potential at the collector of the transistor 32, minus the collector emitter drop in the transistor at saturation. Thus, transistor 32 is conductive during the periods $T_2$ represented by the signal EOSF, and nonconductive when EOSF is true during periods $T_1$ (see FIG. 2f).

The input network 30 has an output terminal 33 which operates as a current summing point. The electric current flowing into or out of that summing point or terminal 33 is the current which flows into or out of the integrator 22, provided the mode switch 52a is in the closed position as illustrated. The terminal or summing point 33 is formed by a junction of a resistor network which includes the resistors 34 and 35. The resistor network is connected between +B and −B voltage potentials which are preferably of oppositely equal magnitude in relation to ground. The collector of transistor 32 connects to a tap of resistor 34.

The resistances of the resistors 34 and 35 are selected so that their ratio determines the particular voltage levels as applied to the summing point 33 at conduction and nonconduction states of transistor 32. The sequence of EOSF (positive) and $\overline{EOSF}$ (ground) pulses at the collector of transistor 32 changes the voltage at the summing point 33 by operation of the transistor 32. For a pulse EOSF current will flow into summing point 33 and integrator 22, and a pulse $\overline{EOSF}$ causes current flow flow from that summing point and out of integrator 22.

The current balance in summing point 33 is determined by the biasing potential, i.e., the ratio of the resistors 34 and 35, and by the duration $T_1$ of a pulse EOSF relative to the duration $T_2$ of the respective succeeding or preceding pulse $\overline{EOSF}$. For the particular biasing ratio, and for a corresponding and desired ratio of pulse durations $T_1/T_2$ the sum of the current flowing into and out of terminal 33 during a total cycle period as far as the flip-flop EOSF is concerned, is zero.

Since, as stated above, integrator 22 maintains its output for zero input current, stable conditions are established for a pulse duration ratio $T_1/T_2$ as determined by a selected ratio for resistors 34 and 35 to produce zero current for the integrator input. Should for any reason the duration ratio $T_1/T_2$ of the pulses EOSF and $\overline{EOSF}$ change, then the average current in summing point 33 will not be zero. A residual current will flow into the integrator 22 in case the duration $T_1$ of pulse EOSF increases; a residual current will flow from the summing point 33 and integrator 22 in case the duration $T_2$ of pulse EOSF increases. Though apparent from the foregoing, it should be emphasized, that an average current zero in summing point 33 can be established for any frequency of pulses EOSF as long as the ratio $T_1/T_2$ is the same. This, of course, holds true only within reasonable limits set by the frequency response and recovery time of the elements employed.

A specific problem arises if the pulses EOSF and $\overline{EOSF}$ are rather unequal in duration. In this case the current balance of summing point 33 is obtained by a rather weak current flowing during the longer pulse periods, and a rather strong current flowing in the opposite direction during the respective short pulse periods. For reasons below, it is contemplated that the pulses $\overline{EOSF}$ have a rather long duration $T_2$ (92 percent of an EOSF cycle), and pulses EOSF are correspondingly very short, $T_1$ being 8 percent of an EOSF cycle.

Should for any reason the pulses change in duration, then a change of the short pulse time $T_1$ is effective as a rather high current change per unit time, while a similar change in duration of the long pulse times $T_2$ is effective as a rather small current change per unit time. This means that the integrator output will be changed faster for one type of change than for the other.

In order to overcome this asymmetrical behavior the network 30 is equipped with a branch which can also be called a speedup branch and which includes a transistor 36 having its base connected to receive also the pulse EOSF and $\overline{EOSF}$ from the input network 31. Since it is assumed that pulses $\overline{EOSF}$ regularly last longer than pulses EOSF, the speedup branch is to become effective particularly for the pulses $\overline{EOSF}$. This speedup branch has as specific objective to draw additional current from the summing point, if the pulse duration ratio $T_1/T_2$ declines. If that ratio increases, the branch should not interfere with the current flow in summing point 33.

Transistor 36 controls the charge state of a capacitor 37 resistively connected between the collector of transistor 36 and ground. The nongrounded terminal 37a of the capacitor connects to a tap in a resistor 38 which in turn are connected between B− and the cathode side of a series of diodes 39 having the anode side connecting to summing point 33.

The transistor 36 is rendered conductive and nonconductive with pulses EOSF and $\overline{EOSF}$ respectively. Thus during EOSF, the capacitor 37 is clamped to ground, and during $\overline{EOSF}$ capacitor 37 discharges through resistor 38. The potential at terminal 37a does not drop below any value for which the diodes 39 become conductive as long as pulses EOSF appear at the rate of the pulses CYN. Should, however, due to a sudden increase in the pulse frequency the pulses CYN appear before the sweep signal reaches level A at the established rate for discharge of capacitor 18, pulses EOSF will not be produced until the sweep rate has been changed. In this case, capacitor 37 will continue to discharge until the charge of capacitor 37 will drop to a value so that the diodes 39 are rendered conductive. The diodes 39 will then draw additional current from summing point 33 and thus enhance the resulting time integral for negative current imbalance at the summing point.

The circuit network as described thus far operates as follows and will be explained best with reference to the timing diagrams of FIG. 2, lines a through f. As was stated above, line a of FIG. 2 illustrates a train of analog signals CYNA and line b shows the resulting pulses CYN occurring at a regular rate but there may be some irregularities. It is further assumed that the switch 51a is in the position illustrated, i.e., and accordingly the switch 51d is open, switch 51b is closed and likewise switches 52a, b and c are closed.

It will be recalled that the EOS signal is produced as long as the charge of the capacitor 18 is below the level A. As soon as power is turned on, the charge of capacitor 18 is necessarily low and a pulse EOS will be produced; flip-flop EOSF will be set, and monovibrator CLO immediately produces a pulse passed through the network 15. Transistor 17 is rendered conductive and instantly charges the capacitor 18 substantially to the B+level, i.e., above the level A so that the EOS signal ceases to be true. Additionally, of course, the setting state of flip-flop EOSF is applied to the switching network 15 so that the transistor 17 remains conductive, and capacitor 18 cannot discharge during the true state of flip-flop EOSF.

A first pulse CYN appears and resets flip-flop EOSF. Upon decay of pulse CLO the output of "or" gate 16 turns false and transistor 17 is rendered nonconductive, so that capacitor 18 now begins to discharge. Initially this discharge will be at a rate which is rather uncertain, as the integrator 22 will necessarily not have settled, and the voltage CCV will have an arbitrary, nonconstant value. As discharge level A is reached in capacitor 18, the differential amplifier 27 responds, and again the signal EOS becomes true to set the flip-flop EOSF. Transistor 17 is rendered conductive and the capacitor 18 recharges rapidly. Flip-flop EOSF now stays set until reset by the next pulse CYN, etc.

Whenever flip-flop EOSF is set the single-shot CLO is triggered and produces a pulse, but this is not important for the synchronizing operation, because the flip-flop EOSF controls the capacitor charging control network 15 directly via "or" gate 16: As soon and as long as flip-flop EOSF is set the transistor 17 is conductive to return capacitor 18 to the fully charged state rather rapidly and to maintain this state as long as flip-flop EOSF is set. When flip-flop EOSF is reset through a pulse CYN transistor 17 becomes nonconductive and capacitor 18 discharges at a rate determined by the current flow permitted through transistor 19.

Stable conditions are illustrated in FIGS. 2e and 2f showing the linear sweep of the voltage at the output circuit of capacitor 18 in vertical alignment with the state $\overline{\text{EOSF}}$, while during the state EOSF there is a fast retrace of the voltage across the capacitor 18 succeeded by a period of constant potential +B. As can be seen from FIG. 2d for the normal operation the pulses EOS are of rather short duration, because as soon as the trigger level for the EOS are of rather short duration, because as soon as the trigger level for the EOS generator is reached, capacitor 18 recharges rather quickly.

During the reset state of the flip-flop EOSF the capacitor 18 discharges as stated, and the rate of discharge depends on the state of conduction of transistor 19 in the discharge control network 20. The state of conduction of transistor 19 in turn is determined by the integrator output 22 voltage CCV applied to the input side of the discharge control network 20. It can further be seen that the duration of the set state of the flip-flop EOSF is determined, on one hand, by the speed with which the capacitor 18 discharges to reach level A as this accounts for the time that EOSF turns true. On the other hand, EOSF turns false at the time the next pulse CYN appears after capacitor 18 had reached that level A.

The flip-flop EOSF thus produces a series of pulses of like designation having a frequency equal to that of the pulse CYN but having a phase shift relative thereto in that a pulse EOSF is directly succeeded by a pulse CYN. The alternating pulses EOSF and $\overline{\text{EOSF}}$ as applied to the network 30 determine the average current at the summing point 33 for the integrator 22.

Initially, as power is turned on the integrator provides minimum output so that the capacitor 18 does not discharge, pulse EOS cannot be produced and flip-flop EOSF will not be set. Thus, $\overline{\text{EOSF}}$ will be true for several pulses CYN causing the integrator 22 to control towards an increase of the discharge rate of capacitor 18 until the discharge rate reaches level A for the first time and in between two pulses CYN, effective through pulses CLO for recharge so that a pulse EOS is produced; the flip-flop EOSF will be set, to remain set until the next pulse CYN resets it. Thereupon integrator control by alternating EOSF and $\overline{\text{EOSF}}$ signals will take over. Thus, it is significant that the circuit is self-synchronizing right from the start and we shall discuss the synchronization in greater detail.

The current in the summing point 33, of course, depends on the said pulse duration ratio $T_1/T_2$ and if we assume that flip-flop EOSF stays set rather long so that more current flows into the integrator than out, then the voltage CCV in line 21 will drop. This in turn decreases the conduction of transistor 19 to decrease the rate of discharge of capacitor 18. Accordingly, the production of pulses EOS is delayed to come closer to the next pulse CYN and this shortens the duration $T_1$ of EOSF until short enough so that succeeding pulses EOSF and $\overline{\text{EOSF}}$ have the proper duration ratio $T_1/T_2$ to cause the average current in summing point 33 to be zero.

For zero average current in point 33 the integrator 22 will now have a particular output voltage CCV thereby determining a particular rate of discharge of capacitor 18 commensurate with the existing rate of pulses CYN. As long as the pulse duration ratio EOSF to $\overline{\text{EOSF}}$ is as preselected by the resistor network 34-35, the average current at the summing point 33 remains zero and the integrator 22 provides a stable output. The voltage CCV will be constant, so will be the effective resistance or degree of conduction of transistor 19, and the discharge rate of the capacitor will thus be constant too. The system is synchronized and a regular sawtooth wave-type form as shown in FIG. 2e will be produced. This wave train can also be interpreted as the output of line 24, which is the desired sweep signal.

Assuming now that for some reason the rate of pulses of train CYN increases, then a pulse CYN will come somewhat too early and the flip-flop EOSF stays set shorter than before which in turn causes less current to flow into summing point 33 than flows therefrom and the integrator 22, which operates as an inverter, increases its output CCV, which means that the transistor 19 will be rendered more conductive to increase the rate of discharge of capacitor 18. Thus the period following the belated pulse CYN is reduced and peak detector 27 will cause production of signal EOS somewhat earlier; the reset period $T_2$ of flip-flop EOSF is decreased and this in turn increases the succeeding duration $T_1$ of pulse EOSF.

Thus, if the pulse rate, i.e., the frequency of the pulses CYN increases the rate of discharge of capacitor 18 is likewise increased. If this increase in frequency of the pulses CYN is only temporary i.e., from one frequency to another one, then a new balance between set and reset states of flip-flop EOSF is established very soon and zero current will prevail again in the summing point 33. The integrator output will have settled to another output value CCV commensurate with a now faster discharge rate of capacitor 18.

If for any reason the pulses CYN appear later than expected because of a more or less sudden decrease in frequency, then the durations of $T_1$ of pulses EOSF will increase and the respective succeeding pulse $\overline{\text{EOSF}}$ will become shorter, i.e., time $T_2$ decreases, so that more current flows into the network 33 than flows therefrom, and the integrator will produce an output tending to decrease the rate of discharge of the capacitor 18. Accordingly level A is reached later, the pulse EOS is produced later and the flip-flop EOSF is set later. Thus, the duration $T_1$ of signal EOSF tends to be shortened again until a new balance is reached to reestablish the proper ratio, maintained now for a lower slope of the sweep signal as derivable from line 24.

In general, during any change in pulse rate the basically unequal durations of set and reset states of the flip-flop EOSF are extended and shortened in opposite directions and for unequal increments, having respectively similar percentage values when referenced against set and reset states individually. This accounts for a temporary average current flow into and out of summing point to change the output of the integrator. Stable conditions can be maintained for any pulse frequency, where by the integrator output varies in proportion to the change in frequency of the pulse train CYN. The pulse duration ratio $T_1/T_2$ remains constant for any frequency of pulses CYN. The output voltage CCV of the integrator is proportionate to the pulse frequency, as it is a measure of the rate of discharge capacitor 18, which in turn establishes the slope of the sawtooth wave fed into line 24.

It can be seen further, that in case the switches 51 change position the pulses SCO serve as input signals for this synchronizing circuit. In particular, the pulses SCO reset the flip-flop EOSF, open switch 51b prevents the pulses CYN from entering directly the "or" gate 23, but closed switch 51d permits direct application of pulses SCO to the single shot CLO for the same reasons expanded above, namely to trigger the single shot if flip-flop EOSF was not set due to too slow a discharge rate of capacitor 18. Otherwise synchronization is established in to the pulse train pulses SCO in exactly the same as it was by operation of pulse CYN.

It will be appreciated that it is conceivable that the pulse rate such as of the pulses CYN or SCO increases to such a degree, that the next pulse arrives already while capacitor 18 still discharges, i.e., before the signal EOS was produced to set flip-flop EOS. Should that happen, either through the switches 51b and 52c or through switch 51d (if pulses SCO are used) as the case may be, the monovibrator CLO is triggered by that rather early pulse CYN or SCO to cause opening of the transistor 17, even though the level A has not yet been reached and capacitor 18 is recharged more or less instantly. Thus, a pulse EOS which was due soon is not produced, and during this particular phase the flip-flop EOSF will not be set.

Failure of a pulse EOSF to appear at all, of course, immediately disturbs the balance at the input side of the integrator 22. By operation of the diodes 39 the current at point 33 will soon have a strong negative component, causing a drastic increase of the voltage CCV in line 21, and the rate of discharge of capacitor 18 will be considerably higher for faster discharge, so that the next pulse EOS will be produced considerably earlier. Flip-flop EOSF will be set again prior to the respective succeeding pulse CYN or SCO as the case may be. Thus, one of the contingencies for which "or" gate 23 is provided with alternative inputs, is the maintaining of synchronizm between recharge of capacitor 18 and control pulse occurrence, be it SCO or CYN, for the case of a rapid pulse rate increase; otherwise, the system will keep track of the change in frequency by operation of the synchronizing loop as described.

Before proceeding to the description of the next unit, it should be mentioned, that the pulse duration ratio for which zero input current at the integration is established, may be varied by changing the resistance network at the input for summing point 33. In particular, the pulses EOSF may be extended (and $\overline{EOSF}$ shortened accordingly), by connecting a resistor 68 in parallel to resistor 35. A mode switch 53b provides for this different operation condition, and it can be seen that upon closing switch 53b, for the same rate of pulses CYN (or SCO), the slope of the sweep signal in line 24 is increased, and the pause in between succeeding sweeps is likewise increased.

We have not yet described the operation of gate 14 and the function of a flip-flop ASF, both shown in FIG. 1a. However, for proper understanding it is advisable to proceed first to FIG. 1b. Up to this point the pulse train fed to the reset input side of the flip-flop EOSF was treated as an entity. We will proceed now to the description of the selecting unit 40 with the aid of which particular pulses can be selected for controlling specific events related to the pulses as selected, an for observing the results of such selection. The circuit to be described presupposes that the pulse train CYN is comprised of groups, each group comprising a particular number N of pulses and the groups follow sequentially whereby any pulse can initially be regarded as the first one of N impulses forming a group, and the next group follows thereafter in regular sequence.

This being the general case, for the specific engine testing application this means that we now take into consideration that for an engine with N-cylinders, the firing pulses CYNA occur in groups of N-each. It is basically arbitrary which pulse is the first one in a group. It will be recalled that pulses SCO concurred with such initially arbitrarily selected "first" pulses of a group of pulses CYN; the arbitrary selection is evidenced by the arbitrary hookup of probe 12.

The selection circuit 40 includes primarily a counter 42 having as many stages as are needed to count the maximum number of pulses expected to pertain to the group. Presently it is presumed that this be eight so that the counter has three cascaded toggled flip-flops which thus constitute a binary counter. The output lines F1, $\overline{F1}$, F2, $\overline{F2}$, F4, and $\overline{F4}$ represent true and false output signals of the three counter flip-flops and can be interpreted as defining the numbers 0 through 7 in binary code as representation of the eight counting states.

A selector switch 41 determines the cycle range of the counter and thus the number N of the pulses per group to be counted for purposes of defining the group and of sequencing the groups cyclically. The switch 41 may have as many positions as are needed and presently it is assumed that three numbers may be needed to define pulse groups 8, 6 and 4. This for example, comes from the fact that automobile engines usually have eight, six or four cylinders. Switch 41 stays in position 41-1 for selecting pulse group number 8, position 41-2 will be established for selection of pulse group number 6, and position 41-3 is provided for the selection of pulse group number 4.

The input signals for the selection switch 41 are derived from the counter 42 and represent counting states seven, five or three. The output line for selector switch 41 feeds to the reset input for the counter to reset the counter 42 to counting state zero when the selected number has been reached. This provides for recycling operation of the counter to establish a ring counter with adjustable recycling frequency.

The counting signals themselves are derived from a clock pulse forming network 45 and the clock pulses are denoted CLK. The network 45 comprises "or" gate 46 having one input terminal connected to the selector switch 51e to respectively receive either the pulses CYN or the pulses CLO. It is specifically pointed out that for the case when pulses CYN operate as the controlling pulse to which the time base generator 10 has synchronized as aforedescribed, the clock pulses for the counter are the pulses CLO, so that the position of 51e, which is ganged with the other switches bearing the number 51, is illustrated correctly.

The reason why for the alternative position of the switch 51e pulses CYN are used as clock pulses depends upon the particular mode or the preferred mode of utilizing the invention and is based on the assumption that the pulses CYN and SCO bear a particular relationship. If the input pulses for generator 10 are pulses CYN, one pulse CLO is produced per pulse CYN to serve as clock pulse CLK for the counter. If the input pulses for generator 10 are pulses SCO, the pulses CLK for the counter are pulses CYN. Thus counter 42 keeps always track of the pulses CYN. Why then the latter pulse train is not always used for clock pulses CLK has to do with a particular phase situation of count state changes in relation to the pulses CYN. Intentionally or otherwise it may happen that a particular one or several pulses CYN are missing. Using then the pulses CLO for counting eliminates the problem resulting from a missing pulse CYN. Moreover, it is of advantage to operate the counter slightly ahead of appearance of the respective next pulse CYN so that a pulse CYN appears definitely during a particular counter state; the reason for this advantage will become more apparent when the operation of the counter for display selection will be discussed. These and other contingencies are not existent when pulses SCO are the input for the sweep generator 10.

As long as the pulses CYN operate as the principal input pulse train for sweep signal generator 10 the clock pulses for the counter are the pulses derived from the monovibrator CLO. If the pulses SCO bear the basic relationship to pulses CYN, in that each pulse SCO marks the beginning of a pulse group CYN, then the pulses SCO serve also for resetting the counter 42 to zero in order to place the counter in step with the initial selection of what is regarded as the beginning of a group of pulses CYN. It should be noted, that during proper operating a pulse SCO is needed for resetting of the counter only once, i.e., initially. From then on the counter 42 remains in synchronism. However, it is conceivable that a particular clock pulse CLK is not produced for any reason; this would place the counter out of step. Using SCO for resetting the counter 42 thus serves as a self-correcting measure, to maintain a recycling of the counter in phase with the recurrence of groups of pulses CYN.

It could be observed, that resetting of the counter 42 via the selector switch 41 and from the "first group pulse" in SCO via "or" gate 48 is a redundancy for normal operation. However, in the testing mode described below it may occur that a pulse or pulses SCO are not produced, and for this case then the selector switch 41 provides a single resetting pulse for the counter 42.

The resetting pulse from "or" gate 48 is also applied as a clock pulse to the alternative input for an "or" gate 45 and it takes care of the problem which exists if a particular clock pulse CLO does not occur in the same situation, when a pulse SCO does not reset the counter. Both cases are special situations separately dealt with below.

A switching network 47 is connected to all stages of counter 42 and is adjustable to select any count number which the counter 42 may reach during counting and cycling, including count number zero. Thus each time during a counter cycle when the counter reaches a particular number, network 47 produces a count select signal designated CLS. It is apparent that the train of signals CLS appear at the same cycle rate as the reset pulses for counter 42 derived from switch 41 and/or pulse source SCO. However, the phase of the pulses CLS in relation to the reset pulses for the counter is indicative of a particular pulse CYN as selected within each group of pulses.

The pulses CLS are basically used twofold. The principal function is to set a control flip-flop DLC receiving also the clocking signal CLK for input clocking. The flip-flop DCL when set is reset by the respective next pulse CLK. This operation is accomplished, for example, by using the set output of flip-flop DCL for input gating of the reset input, while the set side input of the flip-flop is inhibited. The flip-flop can be set only when reset and vice versa. It is thus apparent that normally flip-flop DCL remains set for a period of time equal to a pulse train period CYN and succeeding the period during which the counter had reached the selected number. FIG. 2, lines $i$ and $j$ respectively show signals CLS and DCL, each having duration equal to a clock pulse train period CLO or CLK, and each being true during occurrence of a respective particular one of the pulses CYN.

The second use made of the signal CLS is in the unit 10 in that it links the counting and selecting network 40 with the loop of the time base generator 10 as described previously. The signal SLC serves as an alternative input for the single shot monovibrator CLO for purposes of gating the signal EOS directly into the input side of the single-shot CLO. The specific instant when this occurs will be described later with reference to FIG. 2 as this is being used during a specific operational state. Presently, however, it should be mentioned why this particular input signal CLS for the monovibrator CLO does not disturb normal loop operation of the sweep signal generator 10.

As it can be seen also from FIG. 2, lines $g$ and $h$, counter 42 is advanced by the falling edge of each signal CLO during the synchronizing mode; from line 1 one can see that the signal CLS is produced immediately following a clocking signal CLO, depending upon the particularly selected adjustment of the count number by means of select circuit 47. Selection is basically arbitrary as far as the loop operation is concerned. At the time immediately succeeding the time that CLS turns true and depending upon whether the loop is synchronized, the signal EOS may or may not be in existence. If EOS is in existence, it will, however, decay soon so that the single-shot CLO cannot be triggered anymore. If the EOS signal was in fact in existence, the monovibrator CLO is recovering and thus is not responsive to any coincidence of EOS and CSL.

If the signal EOS was not in existence at the time the pulse CLS is produced first or commences to be true, no input for single-shot CLO is necessarily produced by the signal CLS. The signal CLS stays true for one pulse period as far as the pulses CYN is concerned. This pulse period is terminated by the production of a pulse EOS which triggers single-shot CLO twice, once as gated through the signal CLS and second by setting flip-flop EOSF as aforedescribed. This is merely a redundancy introducing no error. Thus, it can be seen that the signal CLS does not disturb loop operation during the synchronizing mode.

As was mentioned above, we have not yet completed the description of the self-synchronizing generator 10 as far as a particular refinement is concerned. Depending upon the particular type of utilization, it may be advisable to have the input network such as the monovibrator CYN not continuously in a condition for searching for a spike in the analog signal CYNA for producing a pulse CYN. Noise in the circuit may reach the response level. For this case the gate 14 is provided for receiving a CYN-gating signal, called CYNG and which is derived from a network 29.

This network 29 is similar to the networks 27 an 28 but operates at a different biasing level. The discharge level C to which network 29 responds is closer to B+ than is level A. Thus as the capacitor 18 discharges, and at a time before reaching level A, the network 29 responds to produce pulse CYNG. As the capacitor 18 passes charge level C, it continues to discharge, because reaching of the level C produces no control effect in the capacitor charging and discharging circuits.

The gating signal CYNG is false, as long as the capacitor 18 has a charge level above C, the gating signal CYNG is true, when the capacitor has discharged to level C. This gating signal is thus true well ahead of the pulse EOS because level C is reached before level A during discharge. Thus, CYNG turns true well ahead of the usually subsequently expected arrival of the next pulse CYN. On the other hand, level C should be selected so close to level A, that actually during most of the discharge, say 75 percent in time, one of the "and" gates of gate assembly 14 is inhibited because CYNG is false when the capacitor 18 is at level +B or any level above C. This way spurious pulses not pertaining to the pulse train CYN are substantially eliminated.

The particular level to which this network 29 responds is a tradeoff between two aspects. One aspect is that one wants to have this gating "window" as short as possible in order to keep as many spurious pulses out of the circuit as possible as this decreases the probability of interference. On the other hand, one has to take into consideration that the pulse rate of the pulses CYN may speed up, and the fastest rate expected must not be so high that a pulse CYN may even be earlier than the opening of the gating window. On the other hand, it has to be observed, that during normal operation and in cases of a frequency decrease, pulses CYN occur after a retrace when CYNG as thus produced is false again. Since this occurs only after flip-flop EOSF has turned on, the gating "window" must be extended to include the EOSF-true period. The second "and" gate of gate assembly 14 thus ensures that the total gating window is defined by the relation CYNG+EOSF.

The gating network 14–29 as provided, however, introduces a problem which can be described as follows and which is particularly pertinent at the beginning of the operation. Initially, after power has been turned on, the integrator 22 will provide a particular but arbitrary output value. In general this value will be a rather low one, so that the rate of the discharge for capacitor 18 is rather slow. As now the pulses CYN are applied to the network 10 the capacitor 18 may reach level C after the second pulse CYN, so that the gating window CYNG blocks out one or even several desired pulses CYN. This would mean that the circuit would synchronize not to the pulses CYN directly but to an integral multiple thereof.

The flip-flop ASF eliminates this problem by introducing an imbalance into the integrator 22 should the latter tend to synchronize not to CYN, but to 2CYN or 3CYN etc., to be called erroneous sync mode. In an erroneous synchronizing mode, the counter 42 is not advanced in synchronism with the true CYN pulse train, but by the pulses CLO, occurring also at the erroneous rate 2CYN, 3CYN, etc. as the case may be. Flip-flop ASF receives as set side input a signal that is true for count state zero ($\overline{F}_1 \cdot \overline{F}_2 \cdot \overline{F}_4 = 1$). On the other hand, flip-flop ASF is clocked by the pulses SCO used here as indicator for the first CYN pulse per pulse group. The pulse SCO is not gated and thus never inhibited. Since for normal synchronization the counter is shifted to count state zero by a pulse CLO preceding the signal SCO, the count state zero should always be true when a signal SCO occurs. The set side input for flip-flop ASF is now enabled by a signal which can be described as: "count state zero not true" ($=F_1+F_2+F_4$). Thus flip-flop ASF can never be set for and during normal and proper synchronization.

In case of erroneous synchronization, however, there will occur the circumstance in which the count state zero is not true when a pulse SCO is introduced, and flip-flop ASF will be set. The signal count-state-zero-true serves as reset gating signal for the flip-flop ASF.

When in the set state, flip-flop ASF introduces a true signal to input network 30 operating therein analogously when EOSF is true, but overriding control by $\overline{EOSF}$. This means that more current is drawn from the summing point 33, integrator 22 increases the voltage CCV and the rate of capacitor discharge is increased. This will occur up to the time that the rate of capacitor discharge is fast enough, so that the network 29 can respond before any pulse CYN occurs, i.e., until no pulse CYN is outside of the gating window produced by the noise suppressor gate 14.

This correction may take several steps, because the system may, for example, have synchronized to a 4 CYN rate, and 3 out or 4 pulses CYN have then been blanketed by the gate 14. By operation of flip-flop ASF the integrator input is disturbed at summing point 33, and the discharge rate for capacitor 18 is increased. The CYN pulses are, so to speak, pulled one by one into the gating window, and once that has been accomplished completely the self-synchronizaton as aforedescribed takes over.

The basic function of the time base or sweep signal generator 10 is to control the horizontal deflection coil or coil system 101 of an oscilloscope 100 in accordance with the sweep signal developed in line 24. Sweep rate and retrace can be synchronized to the signals CYN as they recur with regard to their particular characteristics used for producing the control pulses CYN. Moreover, sweep rate and recurrence of retrace of the sweep signal will follow any change in frequency of the signals CYNA.

The same holds true if the switches 51 are changed in position so that the generator 10 synchronizes to the pulses SCO. We now proceed to the description of the control of the vertical deflection system of the oscilloscope receiving the quantities to be displayed on the screen of the oscilloscope.

As is symbolically indicated in FIG. 1, all of the signals CYNA are also fed to the Y-driver of the oscilloscope 100 because the shape and configuration of these analog signals is the principal feature to be displayed. A circuit is needed to coordinate the analog signals with the sweep. There is thus provided a control circuit 64 which provides a signal to a control device 65 which in turn controls a control grid or grid system 102 to provide for unblanking of the oscilloscope 100 during specified periods. Whenever a "true" signal is passed from network 64 to the unblanking control device 65, the electron beam can be produced, i.e., is not inhibited or suppressed, while a false signal at the output of the network 64 will result in an inhibition of the production of the electron beam in the oscilloscope 100.

As illustrated, an "and" gate 66 controls the unblanking circuit 65 normally, thereby causing the unblanking circuit to be inhibited only for the periods of time during which there occur control operations. Thus display is produced when the clock pulse CLO and the signal EOS are not in existence, and when flip-flop EOSF is in the false state. When CLO is true, there occurs the fast retrace and when EOS or EOSF are true, there is no sweep (see FIGS. 2d, e, f, and g). The coincidence $\overline{CLO \cdot EOS \cdot EOSF}$ marks the period of production of the ramp or sweep voltage as derivable from line 24, for producing the horizontal sweep. The gate 66 has a fourth input, shown as inhibitor input and being effective as such only when a switch 53a is closed. When switch 53a is open, gate 66 is controlled only by the three other inputs. The unblanking control 65 permits the electron beam to hit the fluorescent screen of the oscilloscope 100 to write the curve representative of the analog signal CYNA as concurrently applied to the Y-driver. In this most simple mode, all signals CYNA are superimposedly displayed on the screen and permit a rough estimate as to their uniformity.

For purposes of providing a better illustrative representation of the signals CYNA, as they may, for example, be the voltages in the ignition circuit, the system illustrated includes means which permits inspection of the waveform of all these ignition pulses, concurrently and in a vertically stacked manner. This is accomplished by connecting a digital-to-analog converter 43 to the output side of the counter 42 to provide an analog signal in proportion to the state of the counter 42. FIG. 2h can be interpreted as illustrating this analog output furnished by converter 43. Each counting state is associated with the appearance of a particular pulse CYN, and due to the cyclic production of these pulses it will be always the ignition pulse for a particular cylinder which appears at a time the counter 40 has a particular counting state. The vertical lineup of the leading edges of the signal shown in FIG. 2h, with the analog signals CYNA of FIG. 2a show this phase relation and association between analog information signals CYNA and the analog counter output signal.

An algebraic adder 49 adds the amplitudes of the signals CYNA and the counting analog signal. Upon closing a stacked mode switch 55, the output signal of the adder 49 is used to control the Y-driver of the oscilloscope. This mode of Y-driver control results in different, vertically stacked base lines for the ignition signals CYNA, one base line per cylinder and spark plug circuit. Each base line is established by the counter output analog signal being representative of an instantaneous amplitude value zero of signals CYNA. The CYNA signals appear as being superimposed upon their respective base lines, whereby the analog signals CYNA pertaining to a pulse group appear one above each other but with sufficient space in between to permit individual inspection. The signals CYNA pertaining to the same cylinder are superimposed, but are referenced against the same base line as they pertain to a particular counting state.

This stacking of the signals for display has the advantage that the entire width of the oscilloscope can be used for each of these ignition signals, while all of the ignition signals can be inspected individually for each cylinder at the same time and comparisons can be made with regard to the waveforms of the several pulses and signals. Of course, this stacking mode of display operation restricts the resolution of the amplitude to some extent, because all of the signals must fit in the vertical dimensions of the screen.

For the case when only one particular cylinder signal is to be displayed, the particular cylinder must be selected and here the count selector 47 and flip-flop DCL come into play. For this case, now there is provided the switch 53a, which when closed, as was stated above, provides an inhibiting input to the gate 66. Switch 53a is the single signal display mode switch. For reasons of simplification, we assume that this switch 53a is not ganged with the switch 53b (FIG. 1a) as this is not essential. As mode switch 53a closes, network 64 is controlled only by gate 67. This gate 67 normally runs also parallel with gate 66, which is unimportant because the periods in which the output from the gate 67 provides for an unblanking control are included in the periods in which the gate 66 provides an enabling signal. Thus, the operation of gate 67 is merely restrictive and comes into play only when mode switch 53a closes. Now, with gate 66 being inhibited due to the closing of the switch 53a, the gate 67 alone provides an unblanking signal for the duration of the pulse DCL, exclusive the CLO and EOSF pulse duration, as no sweep occurs when either of them is true. By comparing the signal DCL with the sweep signals and the analog signals (FIGS. 2j, 2e, 2a respectively) one can see that only one analog signal per pulse group cycle is displayed. p Thus, by cooperation of the selection circuit 47 with -driver, and due to synchronism as between the selection circuit 47 with the loop 10, analog signals CYNA can be observed for each cylinder individually. The analog signal to be observed can simply be changed by means of the count number selector 47 without changing the synchronization. Since switch 55 is in the illustrated, nonactuated position for the single-signal-in-a-group display and thus adder 49 is disconnected from the Y driver. Depending upon actuation or nonactuation of mode switch 53, one or all of the signals CYNA will be displayed. When mode switch 53 is actuated, the display will be controlled by the control grid 102 which in turn is controlled from device 65.

Another type of display can be used when the switches 31 are changed in their position. As it was explained above, the loop 10 then synchronizes to the pulses SCO. The switches 51 were introduced above primarily to slow alternative inputs for the sweep generator 10. Now these switches are to be interpreted as display mode control switches to provide for a particular type of display.

For each sweep as derivable from line 24 there will be as many analog signals CYNA as pertain to the selected group, for example, as many ignition pulses as an engine tested has cylinders. The Y driver of oscilloscope 100 still receives all the signals CYNA through nonactuated mode switch 55 but the sweep is retraced at the rate of the pulses SCO. The ignition signals for all cylinders during one engine cycle will be reproduced once for each sweep and can thus be observed side-by-side. This has the advantage over the stacked mode, in that all signals can make full use of the vertical resolution capabilities of the screen. They are, however, contracted in time, i.e., in the horizontal.

It follows from the foregoing, that the analog signals CYNA can be observed simply in an overall superimposed relationship. For this case all illustrated mode switches are deactivated and have the illustrated positions. One may, however, use a separate control or mode switch connecting the analog signal sensor or pickup 11 to the Y driver of the oscilloscope. By operation of the switch 53a, one signal per group is observed, thus permitting observation, for example, of the ignition signals for a particular cylinder. By operation of the selector 47, the particular signal per group can be changed. By operation of switch 55 all signals within the recurring groups are displayed in vertically stacked relation, while by operation of switch 51 all signals for each recurring group were observed side-by-side. For each type of display the frequency of occurrence of the analog signals can be changed; for the engine testing case on can change the engine speed, but the generator 10 follows this change by adapting the sweep rate to the change in pulse production. Thus, the effect of speed change on the ignition circuit can readily be observed on the screen of the oscilloscope 100.

From the illustration of FIG. 2a one can see, that the ignition spikes 11 are very steep and thin. Due to the constant horizontal sweeprate, the brightness of the spot along the trace forming a spike would be rather dim in comparison of the trace. The system illustrated includes circuitry 70 to the effect of increasing the intensity of the electron beam in the oscilloscope for the steep spikes.

The analog signal CYNA is first amplified in the circuit 70 and then the derivative is formed in a differentiator 71. The differentiator is biased, so that for most portions of the analog signal the output varies very little, but a rather high output value is produced for the spikes 111. Since the spikes vary in steepness, the differentiator output is used to control the emitter potential of a transistor 72 having constant base bias to provide a constant current. Thus, for a wide range of spikeslopes, the differentiator causes transistor 72 to saturate. The transistor 72 controls the cathode of the oscilloscope 100 to increase the intensity of the emitted electron beam for the spikes 111 but not otherwise. The constant current behavior of transistor 72 ensures that the spikes 111 will be displayed uniformly brighter, as the response of this brightness increasing device does not produce a variably greater brightness for differing steep slopes.

The output of differentiator 71 passes through a gate 73, receiving a gating signal from a control circuit 74 which normally provides a true signal except for the period of sweep retrace marked by the pulses CLO ("and" gate 76). For the signal display mode, a switch 53c ganged with the mode switch 53a inhibits the gate 76 not to produce a gating signal, but an "and" gate 77 provides a gating signal for the periods when DCL is true, to restrict the brightness increase to the spike analog signal.

We now proceed to the description of different types of tests and control operations requiring the completion of establishing synchronization in the generator 10. For this, control switches 52 are placed in the alternative position to establish the constant sweep mode while switches 51, 53 etc. remain in the illustrated position. Looking at the several switches 52 in detail it can be seen first that the EOS signal is now inhibited from directly causing setting of flip-flop EOSF due to opening of the switch 52b.

The switch 52a when open disconnects the input of the integrator 22 from the input network 30, so that the voltage CCV will remain constant. Thus, the discharge rate of the capacitor 18 previously established during the synchronizing operation is maintained irrespective of any change in the current flow at summing point 33. When switch 52c is open, the direct path for the CYN pulses to the "or" gate 23 and the monovibrator CLO is interrupted, and only those CYN pulses concurring with a $\overline{DCL}$ gating signal may pass through "or" gate 23. As far as the resetting for flip-flop EOSF is concerned, the pulses CYN continue to operate as signals for resetting the flip-flop. However, as it can be seen from the input circuit of the set side of flip-flop EOSF the setting of the flip-flop is now permitted only during a period of time when the select control flip-flop DCL furnishes a true signal.

In a manner as aforedescribed, each pulse from the monovibrator CLO renders the transistor 17 conductive causing capacitor 18 to recharge. Capacitor 18 discharges as aforedescribed through transistor 19 and at the rate which was established previously, by the now fixed value of the control voltage CCV for transistor 19. Also, as aforedescribed, whenever the capacitor 18 has discharged to level A the detector 27, 28 responds and produces the signal EOS. The signal, however, is unable to set the flip-flop EOSF unless DCL=1. It thus appears, that the production of clock and retrace control pulses CLO does not occur in the regular manner as during synchronization.

The main input for monovibrator CLO is the flip-flop EOSF, which however will now be set only when DCL is true. The pulses CYN can serve as direct input for monovibrator CLO only when $\overline{DCL}=1$. Additionally, however, the signal EOS will serve now as an effective direct input for monovibrator in the circumstance CLS=1.

It follows, that the occurrence of retrace control, i.e., of triggering of monovibrator CLO differs for different ones among the several input conditions at the "or" gate 23. Consider first that DCL=CLS=0. For this situation, flip-flop EOSF will not be set when EOS turns true, so that monovibrator CLO will not be triggered. Instead, triggering occurs only when the next pulse CYN arrives, which may enter gate 23 as $\overline{DCL}=1$. It will be recalled, that during the synchronization flip-flop EOSF was set for the period between EOS=1 and CYN=1 but now during the constant sweep mode flip-flop EOSF is not set for DCL=0. This means that the capacitor 18 is not recharged more or less at the instant it reaches the level A, but the capacitor 18 continues to discharge, now for a period of time equal to the period for which during the synchronizing mode and after completion of synchronization the flip-flop EOSF was set. The left-hand portion of FIGS. 2l m and n show that the sweeps last longer, so do the pulses EOS, and signal EOSF is not produced as long as DCL is not true (compare with line p).

More or less instantly succeeding the leading edge of a pulse CYN, a pulse CLO is produced, and only then capacitor 18 is recharged, but also then instantly it begins to discharge again. The sweeping output signal as produced and fed to the line 24 under these changed conditions is depicted in FIG. 2l. The peak discharge reached now is higher than the peak during the stabilizing mode. In he stabilizing mode the peak was level A and could not exceed this level, because detector EOS triggered the recharge. In the constant sweep mode the lever now reaches A−ΔA with ΔA being a value as a charge level drop possible for the period equal to $T_1$ and at the discharge rate previously established in the synchronizing mode.

The synchronizing mode established a waiting period $T_1$ between the end of one sweep and before a new sweep could commence. This was the period during which flip-flop EOSF was set and this is proportional to the pulse rate period. Let $T_1/T_2$ be K, which is a fixed constant, then the slope of the sweep is equal to $A/T_2 = A K/T_1$; it follows that $\Delta A = AK(T_1/T_1) = $ constant. Thus the value ΔA is likewise independent from the pulse rate and independent from the previously established particular slope of the discharge current for capacitor 18. This is important for reasons of the discussion below.

Now consider the fact that each pulse CLO appears also as a clock pulse CLK through the "or" gate 46 and the binary counter 42 is shifted to the respective next counting state. It shall further be assumed that a particular number was adjusted with the count selector device 47. In the illustrated example of operation (FIG. 2) it is further assumed that this group adjusting switch 41 is adjusted to a position 41–3 for selecting a length of four pulses (four cylinder engine). The number adjusted by network 47 now is presumed to be 2 (decimal). This is depicted in that a particular clock pulse CLK, initiated and resulting from a pulse CLO, triggers production of the signal CLS to concur with the respecting counting state, see FIG. 2o.

A signal CLS can be produced only after a pulse CLO has been produced, while the latter caused signal EOS to decay so that nothing happens at first in the sweep circuit 10, i.e., the signal CLS is not effective in the input circuit for the monovibrator CLO at the instant of its occurrence. The capacitor 18 again discharges after this last mentioned retrace and when reaching level A, the resulting pulse EOS is produced as usual. Now consider the input circuit for the monovibrator CLO, and it can be seen that in this constant sweep mode pulse EOS is produced for the first time while the signal CLS is still true; thus monovibrator CLO is triggered. Hence, there is what can be called a premature pulse CLO, which as clock pulse shortens the particular counting state period and prevents the sweeping signal from exceeding the level A. This is shown as covering the period X in the diagram 2l.

As the counter is advanced again by this particular pulse CLO operating as clock pulse CLK, this clock pulse will set the flip-flop DCL. Thus, $\overline{DCL}$ ceases to be true, and the particular pulse CYN soon to be expected is blocked from the input circuit of the monovibrator CLO. It is thus clear that the signal DCL is produced with certainty during a period of expectancy for a particular pulse CYN, once per counter cycle. The time of occurrence of the clock pulse CLO(X) which causes the flip-flop DCL to be set will necessarily precede the pulse CYN as selected indirectly by way of the count selector 47. The signal DCL then blocks the input circuit of monovibrator CLO for that particular pulse CYN. This means, that the pulse CYN so selected occurs during a sweep and not at the beginning thereof, which can readily be verified by observing the line up as between the sweep during period Y and the pulse train CYN.

It can be seen further that the flip-flop EOSF has its input set side enabled by that signal DCL, but is not yet set. During the period designated as Y in FIG. 2l the capacitor 18 again discharges down to the level A, and thereafter signal EOS will be produced. Since now the signal DCL is true, flip-flop EOSF is set again to serve as an input for the monovibrator CLO and again to operate the recharge control circuit 15. Thus capacitor 18 is recharged and the sweep is thus again interrupted at level A. The signal DCL blankets with certainty a particular period of time Y during which a particular pulse CYN within each recurring pulse group will occur. At the end of this period Y, the flip-flop EOSF is set and remains set. Thus, the sweep is interrupted for a period designated Z.

It must now be observed irregularity actually there were two clock pulses CLO produced in association with the one blanketed pulse CYN (x). (See FIG. 2r in comparison with 2b). Thus, the next pulse CYN must not produce a counting pulse for the counter 42, and the capacitor charge and discharge circuit must be brought back in synchronism with the CYN pulse train. This is the purpose for setting the flip-flop EOSF and maintaining the set state for what is designated the period Z. The flip-flop EOSF stays set until the next pulse CYN turns it off. As long as flip-flop EOSF is set, switch 15 remains open through the alternative input of the gate 16. Thus during this period of time Z the capacitor 18 is prevented from discharge and is clamped to the level B+.

As the next pulse CYN, succeeding the selected and blanketed pulse CYN, arrives at the end of the period Z, flip-flop EOSF is reset. However, as long as the flip-flop EOSF was set the single shot CLO could not recover. Thus, this pulse CYN is not able to trigger the single-shot CLO and hence no clock pulse is produced at the end of the period Z. This puts the counter 42 back into step: For the blanketed pulse CYN two clock pulses have been produced so that the respective next pulse CYN is inhibited from producing a clock pulse.

From the description above it will be recalled that the set state of the flip-flop DCL embraces a time interval Y which commences before the occurrence of the pulse CYN, and lasts longer than the pulse CYN, whereby particularly the time between the beginning of the set state of the flip-flop DCL and the beginning of that pulse CYN was the width of the pulse EOSF as it existed during the stabilization period after synchronization was attained. Moreover, the period of time for which the signal DCL is true is completely covered by a sweep. This means, that in relation to the analog signal CYNA, there is a sweep signal operative to cover a period of time for the analog signal which precedes the particular trigger level thereof used to produce pulse CYN. During the stabilizing mode this latter period is covered by a signal EOSF and no sweep is produced. Here, in the constant sweep mode the sweep is made to begin for a period equal to the previously established EOSF pulse duration.

Thus, one can observe on the screen the particularly selected signal CYNA including the portion thereof occurring prior to the trigger level (spike 111). This signal is denoted with an asterisk in line a of FIG. 2. The foregoing has meaning only if one controls the oscilloscope unblanking circuit 65 in a manner that the analog signal be displayed only in the period Y (DCL=1). It is thus necessary to close switch 53a so that the signal DCL can exclusively govern the unblank control via the gate 66.

We now proceed to the assumption that switches 53a and 53b are ganged, or that it becomes desirable to operate them concurrently. For this we must for the moment assume that we are not in the constant sweep mode, but that switches 52 are in the illustrated position for the synchronizing mode. The switch 53b is effective in the network 30 (FIG. 1a) and, as was stated above, the switch 53b connects a resistor 68 between the negative voltage potential −B and the summing point 33 which is the input of the integrator 22. This means that a different balance is provided as between the resistor 34 on the one hand and a parallel resistance combination comprised of resistors 35 and 68. This changes the effective operating conditions for the input of the integrator and provides that now for the same frequency the tendency of the integrator 22 is to increase the discharge rate of capacitor 18, and to thereby in effect cause, by operation of the synchronizing loop, the flip-flop EOSF to be in the set state for a longer period than the period $T_1$ when switch 53b is open.

During this modified synchronization mode, the slopes for the ramp signal as derived from the capacitor 18 will now be steeper, and after a retrace this capacitor 18 is held at the b+ voltage for a period longer than before. This point merely emphasizes, that the selection of periods for set and reset states of the flip-flop EOSF is basically an arbitrary one, and synchronization can be obtained for any ratio. The rather long duration for the flip-flop EOSF to be set established when switch 53b is closed shortens the sweep period ($\overline{EOSF}$).

It is presumed now that switches 53a and 53b are closed and that the system has stabilized; now we change the position of switches 52 to leave the synchronization mode and to enter the constant sweep mode. The set state for flip-flop DCL now begins at a time preceding the selected pulse CYN by a rather long period $T_1$ as was established as the duration of the set state of flip-flop EOSF during the stabilizing mode when resistor 68 is in circuit. Of course, flip-flop EOSF is not set in this constant sweep mode, so that the sweep signal commences rather early before the signal CYNA* reaches the trigger level 111.

It can thus be seen that by suitably selecting or changing the input network 30 and the dimensioning for attaining stabilization at different pulse ratios as between EOSF and $\overline{EOSF}$, one can shift the phase of the beginning of the sweep in relation to the analog signal selected for display. This is important for the general case, as at times important features of the signal to be displayed may precede considerably the trigger level for producing the pulses CYN, while in other cases more important features come rather later after the trigger level in the analog signal. A change in the ratio $T_1/T_2$ is also desirable because one wants $T_2$ to be rather long to provide a long sweep for the normal case; if large $T_1$ is needed for the special case of displaying portions of the analog signal preceding the trigger level the sweep can be shortened. Thus, an adjustment in the ratio $T_1/T_2$ is desirable to accommodate the system to the particular testing conditions. Of course, for each such adjustment the loop in generator 10 can be made to stabilize.

It was described earlier how a particular pulse can be blanketed by providing a time interval (Y) during which the pulse can occur with certainty provided the pulse so selected is in fact produced. It can now be seen that the flip-flop DCL can be used also, for example, to influence the production or effectiveness of such a pulse. Thus, as the signal DCL is used to inhibit the production and/or effectiveness of the pulse CYN so selected, one is certain, that it is selected pulse which is inhibited and not another one. Moreover, the blanketing recurs at the proper cycle rate because the counter remains the step as was described earlier. This pulse selection in turn can be used to determine to what extent the inhibition of the production and/or effectiveness of a particular pulse within the recurring pulse group affects the rate of occurrence of the pulse or analog signal train.

With this, we now proceed to the power test mode which requires that the switch 56 be closed. This power test mode requires also the establishing of the constant sweep mode so that all switches 52 have the alternative position. Here we return to the specific mode of utilization contemplated, i.e., that the signals CYNA represent ignition pulses for a combustion engine. Via mode switches 56 and 52e the pulse DCL is amplified to a more suitable level by an amplifier 61, pertaining to the control circuit 60 which is designed to interfere with the operation of pulses CYNA. As indicated schematically, unit 62 is a circuit which short circuits the points of the engine for the time when they normally open. This means that a particular analog signal such as, for example, CYNA* will not be produced, so that the particular cylinder cannot fire. Since DCL is true with certainty for the time of normal production of the firing pulse for the cylinder so selected, production and effectiveness of the selected ignition pulse is indeed inhibited. It is apparent that for a normal engine this would result in a particular reduction of power and the engine should slow down. This slowdown when occurring causes a decrease in the particular rate of the pulses CYN.

Should it be suspected that one cylinder is faulty for any reason, even though a firing pulse for it is normally produced, then the inhibition of production of that pulse will not cause a reduction of the r.p.m. value, i.e., the frequency of pulses CYN should not change. Thus by changing now the count selector 47, the ignition pulses for one cylinder after the other can be short circuited. If any such selection is not accompanied by a decrease in frequency of pulses, then the cylinder must be faulty and has thus been detected. The detection of a frequency change of pulses CYN or of a frequency change less than normal for such a situation can be done in two ways. Both are conceivable, but one way is preferred over the other for particular situations to be described.

The most simple way is that the output of the amplifier 26 is connected to a peak detector 63. This peak detector 63 in particular responds to the peak level of capacitor discharge. The peak detector 63 may be connected to the line 24 permanently, so that its operation is mode independent. As it can be seen, the peak detector 63 will stabilize to level A during the synchronization mode. However, as the constant sweep mode was entered into and for the periods of time preceding these three periods X-Y-Z, the detector 63 will detect the level $A-\Delta A$, as this is the overall top peak level for the entire sweep signal train during the constant sweep mode. If it is further presumed, that the peak detector 63 has a rather low time constant, so there will be little effect on the peak detector output when at the end of the periods X and Y the capacitor 18 has not discharged down to the level $A-\Delta A$; the peak detector 63 will still hold to its particular level $A-\Delta A$. This frequency independent level, and can be selected as zero marker for an instrument 80'.

It can now be seen that if the selection by the count selector 47 is coupled with inhibition of the production of such pulse, and if such selection and inhibition has no effect on the pulse train frequency of the pulse train CYN then the peak detector 63 will not change its output as the blanketing and inhibition occurs. As stated, this indicates that the selected cylinder is the faulty one. Should, however, the inhibition cause a change in the pulse rate frequency of the pulses, the following will occur:

The period between pulses CYN may, for example, become longer, as is the case for combustion engine testing, due to r.p.m. loss when a nonfaulty cylinder is taken out of operation. After a period of some irregularity the pulse train settles to a new, lower frequency. As the switch 52a (and others) is open, the signal CCV is not changed, so that the rate of discharge of capacitor 18 remains the same. Thus, the circuit will not resynchronize. This in turn means that the pulse peaks of the sweep will increase, because the capacitor 18 will discharge to a still lower level than before the respective belated pulses CYN cause the retrace. How low the level reached will be depends solely on the particular discharge rate as was previously adjusted during the synchronizing mode.

This change in peak of discharge is monitored by the peak detector 63. The change in detector peak value is proportionate to the relative change in frequency of the pulses CYN, and is independent from the absolute value of the pulse rate to which the system was stabilized. The reason for this is as follows: It shall be assumed that for the presently selected cylinder (selector 47) and for the established test mode (56 and 52e closed), the frequency of signals CYNA and of pulses CYN is reduced so that retrace occurs at a level $A-\Delta A-B$. The slope of the sweep is given by $A-\Delta A/T_1+T_2=(A-\Delta A)\cdot f_1$, if $f_1$ is the r.p.m. value prior to the power test, i.e., during the synchronizing mode. If the sweep time during power test is T, then it follows that the increment $\Delta B$ of capacitor discharge occurs during a period given by $T-(T_1+T_2)$. Since this occurs at the previously established slope value $(A-\Delta A)/(T_1+T_2)=(A-\Delta A)f_1$, we obtain $\Delta B=(A-\Delta A)\cdot f_1 (T-1/f)$, or $\Delta B=$ -factor $x(1-f_1/f)$, which means that the detected peak value $\Delta B$ is directly proportional to relative r.p.m. loss suffered by the engine. Hence, the instrument 80' as connected to peak detector 63 will indicate the relative change in frequency which resulted from the inhibition operation, whereby the indicated numerical value is independent from the absolute r.p.m. value. Of course, $\Delta B=0$ occurs when there is no r.p.m. loss, i.e., when the inhibited cylinder is faulty.

We now proceed to the description of the alternative mode for indicating r.p.m. losses or any other changes in the r.p.m. value as the result of the inhibition and blanketing of a particular cylinder pulse. Here we must take into consideration that the pulses CYN may not come at an exactly constant rate. It has been observed that tolerances in, for example, the manufacturing of the distributor in the engine may cause a slight irregularity of the pulses CYN. This may have the following effect. For properly calibrating the peak detector 63 it can be seen that the level $A-\Delta A$ is a fixed one establishing the relative r.p.m. deviation value zero. The synchronization operation will cause the peak detector 63 to register directly the value A but since the constant sweep mode (change switches 52) must always precede the power test (mode switch 56) the capacitor 18 always discharges to the level $A-\Delta A$ during the power test, and it will be that latter value which defines the r.p.m. deviation zero mark for the power test. However, as it can be seen from FIG. 2 this level $A-\Delta A$ is now established only in effect by the occurrence of the two pulses preceding the signal CYNA* which together with pulse CYN* is blanketed and the next pulse simply marks the end of a waiting period. Thus, should the distributor be irregular, it may well occur that the levels A and A−ΔA defined by the stabilizing mode and established using all four cylinders are somewhat disturbed because of pulse irregularities having nothing to do with changes in frequency (r.p.m.-loss). These irregularities are averaged out when all four pulses are used to establish stabilized conditions in the synchronizing mode, but now only half of the pulses are used to establish the normal peak level, and there may be a deviation from the desired zero mark. This in turn means that the peak detector 63 may register a deviation as r.p.m. deviation from the zero mark as calibrated, even though the engine in effect did not slow down and vice versa. It is thus possible that an engine slowdown is in effect overshadowed by the distributor irregularity.

In order to overcome this deficiency an alternative peak detector circuit or r.p.m. deviation detecting circuit is employed. As was aforedescribed, the signal CCV provides a particular value which is directly proportionate to the frequency of the pulses $f_1$ if no inhibition occurred, and thus the signal CCV is representative of the accomplished stabilization at particular operation conditions. We now use this voltage CCV to control another sweep circuit 81, which is basically similar to the circuits 15 and 20. In circuit 81, the voltage CCV determines the rate of discharge of a particular capacitor therein while, on the other hand, capacitor recharge is controlled, as symbolically indicated, by a signal derived from counter 42 and representing count state zero. the capacitor recharge or retrace signal is thus identified by the symbol $\overline{F}_1\overline{F}_2\overline{F}_4$. It should be mentioned, that one should not use the pulse SCO for controlling retrace of the sweep circuit 81, even though normally pulse SCO appears at the same rate as signal $\overline{F}_1\overline{F}_2\overline{F}_4$. The reason for this is that the ignition for the cylinder zero may be inhibited during the power test by operation of the count selector 47. When selector 47 is set to select cylinder zero, the ignition pulse for cylinder zero will not be produced, and pulse SCO will thus not appear. It was outlined above, however, that the counter 42 remains in step even if particular ones of the ignition signals are not produced. Thus production of signal $\overline{F}_1\overline{F}_2\overline{F}_4$ at pulse group or engine cycle rate is independent from this pulse inhibition which may include pulse SCO in the inhibition operation.

The output of the sweep circuit 81 is a sweep signal which is not dependent any more on the particular occurrence of the particular individual pulses CYN. Retrace occurs only after passage of a complete pulse group, as this is identified by the occurrence of the count state zero, and this is truly proportionate to the r.p.m. of the engine.

This sweep signal from circuit 81 is passed to a filter network 82 which establishes an average, not a peak signal. This average signal will now again be proportionate to the frequency of the pulse group, as selected, but independent from the frequency of the pulses CYN. The reason for this results from the fact that again the sweep rate of the output signal is proportional to frequency of pulses CYN (by operation of the integrator input signal CCV), but the length of the sweep is proportionate to (1) the number of pulses per pulse group, and (2) to the inverse of the frequency of pulses CYN. Since the average signal resulting from filtering of the sweep signal is proportionate to the product of slope and duration of the sweep, this average is not dependent upon the pulse frequency but proportionate to the number of pulses per group (adjustment of switch 41).

This average signal as provided by filter 82 is amplified by an amplifier 83. Now for the moment we will turn briefly to the stabilizing mode and assume that stabilization has been attained, so that the signal CCV is in effect constant, but that we have not yet entered the constant sweep mode. The output of amplifier 83 is fed to an amplifier 84 through a mode switch, which is now 52f, and which is closed when the system is not in the constant sweep mode. Amplifier 83 has a very accurately determined gain of unity, and is connected to form also an integrator amplifier; its output is fed directly to its input as negative signal for establishing the current condition zero at the input side of amplifier 84. A voltage meter 80* is connected between the two respective outputs of amplifiers 83 and 84. The instrument 80* will register zero when conditions are stabilized.

During the constant sweep mode the switch 52f is opened and, of course, all other switches 52 change position as aforedescribed. The rate with which the sweep circuit 81 operates remains constant and independent from any subsequent change in frequency of the pulses CYN (and of the signal $\overline{F}_1\overline{F}_2\overline{F}_4$). However, the retrace is controlled from the signal which marks the beginning (or end) of a cycle of pulse groups, which cycle does not include the irregularities of the several pulses CYN. The inhibition operation is carried out by operation of flip-flop DCL in cooperation with adjustment of the selector switch 47 controlling the particular selection of the CYN pulse and CYNA signal to be inhibited. Upon engine slowdown the lengthening of the period of time between the recurrence of the $\overline{F}_1\overline{F}_2\overline{F}_4$ condition will be inversely proportional to the r.p.m. loss. Since the slope of the sweep output of generator 81 is proportionate to the r.p.m. prior to incurrence of the loss, the output of filter 82 will be changed in accordance with the relative r.p.m. loss. Thus, with the switch 52f open the amplifier will now provide the particular new output which is fed to one side of the r.p.m. meter 80*. The other side thereof still receives a particular potential as it was established at the output side of integrator 84 during the synchronizing mode. It thus appears that the volt meter 80* indicates directly again the r.p.m. deviation as it results during the testing mode from the inhibition of one or the other pulse CYN, but the measuring result is free from any distributor irregularities.

The testing equipment to be described next considers the fact that automobile engines usually are equipped with timing markers. There is usually a timing marker 85 on the flywheel and there is a stationary reference marker 86. The markers should register for slow engine speeds, when one cylinder is in the top dead center. This occurs at a particular period of time after the ignition pulse for that cylinder. The period between the ignition pulse of a cylinder and the top dead center position for that cylinder is in fact strictly inversely proportional to the ignition pulse frequency, i.e., to the r.p.m. of the engine, if the distributor has not what is known as ignition advance.

It is now presumed for reasons of simplification, that the particular cylinder for which the markers are to register is the one we selected as cylinder zero. For reasons below this is not essential but convenient. It follows that the position register between markers 85 and 86 should occur during a time when $\overline{F}_1.\overline{F}_2.\overline{F}_4$ is true. Moreover, this position register should occur in between two pulses CYN, i.e., during a sweep signal of generator 10. It will be recalled that EOSF always marks the sweep period of generator 10 because a signal EOSF opens switch 15 for recharge of capacitor 18.

Since the equipment to be described next is utilized in a special mode, there is provided a mode switch 54 accordingly. An "and" gate 91 monitors the state $F_1.F_2.F_4.\overline{EOSF}$, and switch 54 when closed then establishes a gating signal for the first control gate 92 and for a second control gate 93. Next there is provided another differential amplifier 94, basically similar to the EOS detector and others supra, destined to monitor the sweep signal in line 24. It is now particularly significant that the instantaneous amplitude of the sweep signal in line 24 always marks a particular phase in relation to the ignition pulse (spike 111 triggering CYN). Since the slope of the sweep signal in line 24 is proportionate to the engine speed, the sweep reaches any preselected amplitude after a period which is inversely proportionate to the engine speed, which is only another way of saying that each amplitude value of the sweep signal corresponds to a speed independent phase angle relative to the ignition pulse triggering a sweep.

The differential amplifier 94 has an adjustable reference input, there being a potentiometer 96 connected to one input of amplifier 94 accordingly. When the sweep signal is above the adjusted level, for example, a level D, the output of amplifier 94 is false; when the sweep signal is below that level, the output of amplifier 94 turns true. It is apparent, that this level D must be selected to be within B and A (supra), because only then is $\overline{EOSF}=1$. Thus, potentiometer 94 in effect adjusts and selects a particular phase angle relative to the ignition pulses.

The output gate 92 receives the signals from amplifier 94. The output gate 91 (at closed mode switch 54) enables the gate 92 for a period during which the output of amplifier 94 may turn true, and at the instant when this occurs, the output signal of gate 92 fires a flashlamp 97, serving as a stroboscopic illuminating source.

It will be appreciated, that by manual adjustment of the potentiometer 96 and by observation of the flywheel, the lamp 97 can be made to flash at the precise instant of registry between markers 85 and 86. It is now a significant aspect, that once this registering relation has been established, it is maintained even if the engine speed is changed, because as repeatedly stated above, the sweep voltage in line 24 varies its slope with the frequency of the control pulses so that the time between the beginning of a sweep (equal to occurrence of a pulse CYN, i.e., of an ignition pulse) and the traverse of the adjusted level in amplifier 94 varies precisely inversely to the r.p.m. of the engine. It will be observed, that amplifier 94 may in the alternative be connected to the output of sweep generator 81 instead of being connected to line 24. Of course, the adjustment in potentiometer 96 will be somewhat different in this case.

The speed independent registry of markers 85 and 86, however, is true only, if one disregards the operation of the ignition advance in the distributor of the engine, causing the ignition pulses to shift at higher engine speeds. This advance now, can be observed directly as a deviation of the markers 85–86 from the registering position during the strobe pulse. The strobe light pulse follows the ignition pulses in relation to the previously adjusted speed independent phase as between two succeeding ignition pulses (i.e. during a sweep), because the phase between the ignition pulse and the strobe pulse is constant, i.e., the trigger delay varies inversely with the r.p.m.

The flywheel position relative to the instants of strobe lamp flashing shifts in accordance with the advance control mechanism of the distribution of the engine. Thus, the misalignment between markers 85–86 at high engine speeds measures directly the advance, provided alignment or registry was established at low engine speed. One can thus place additional markers 86' and 86" next to marker 86 and these markers can be calibrated directly to indicate ignition advance phase angles.

Aside from the visual indication for the advance thus provided, or the absence of suitably calibrated markers, one can use a voltmeter 80" for measuring the ignition advance of the distributor. The gate 93 introduced above receives the logic inverse of the output of differential amplifier 94, see inverter 99. Thus, gate 93 produces a pulse train, and each pulse has a leading edge when, in the mode as presently discussed, the ignition pulse for cylinder zero occurs. This instant is marked by the beginning of coincidence of $\overline{EOSF}$ and $\overline{F_1}.\overline{F_2}.\overline{F_4}$. The trailing edge of an output pulse of gate 93 is the instant of lamp flashing.

The train of output pulses of gate 93 are fed to an integrating filter 98, and for reasons expounded repeatedly above, the output signal of filter 98 remains constant for speed variations and it changes only when one adjusts potentiometer 96. The output value of filter 98 is thus directly proportional to the phase between the ignition pulse of cylinder zero and the top dead center position thereof for low speeds. This would be true for all engine speeds, if there were no advance mechanism in the distributor.

For low speeds the operator will adjust the potentiometer 96 so that the strobelamp (at low speeds) flashes when marks 85 and 86 register and a particular value will be indicated by instrument 80". Subsequently the operator may increase the engine speed to high values, and then he changes the potentiometer adjustment of the input of amplifier 94 until he observes registry of markers 85–86 at the strobe illumination. It follows, that the resulting change in output indication of instruction 80" directly reflects the change in phase, and the difference to the previously established measuring value and the subsequently detected value is directly proportionate to the phase of the advance. The key to all this is the fact that the slope of the sweep signal in line 24 is directly proportionate to the r.p.m. of the engine, at any instant during the synchronizing mode, and represents true phase advance independent from the engine speed.

At this point, it should be mentioned, that the instruments 80*, 80' and 80" may actually be one and the same volt meter. Instruments 80* and 81 indicate r.p.m. loss during the power test and instrument 80" indicates phase angles. There may be provided two different scale on the same instrument. The different types of tests as outlined above are not conducted at the same time so that one instrument can be time shared, to be connected appropriately when the respective mode switches are actuated.

This time sharing can be extended further if it is desired to indicate actual closing time of the breaker points in relation to the ignition cycle for each cylinder. Thus, the instrument 80''' may still be the same as others. Instrument 80''' may at times (mode switch 57) be connected to an integrator 87 by operating as a ratiometer. The ratiometer 87 will normally monitor the time of closing of the breaker points, and an integrated value directly represents the average closing time.

In particular, there is a threshold detector 88 connected across the breaker points. A voltage level, arbitrary for the present purpose, is selected for adjustment of threshold detector 88. When the level is exceeded the points are regarded as open and the detector 88 provides zero output. When the voltage across the points drop below that value, the points are regarded as closed and detector 88 provides a particular constant output. The ratiometer 87 is a filter integrator. Instrument 80''' will indicate the full output signal of detector 88 if the points are continuously closed. Any lesser value is indicative of relative closing time of the breaker points during an engine cycle, because the output of the device 87 is referenced, for example, by way of scaling in the instrument 80''' against the constant output of detector 88 provided only during closing of the points.

As indicated by the mode switches 53e and 53d, ratio detector 87 can be used for single cylinder measurement in that the relative period of the points during one cylinder cycle is indicated. Again, the selected one of the cylinder is marked by the period when DCL is true, and this indication of relative breaking points closing time in the instrument 80''' can be coupled with the oscilloscope display of the analog ignition signal CYNA pertaining to that cylinder. Here then the point closing time/output of threshold detector 88 is monitored only when signal DCL is true, and this is referenced against the duration of signal DCL, whereby by operation of a long time constant of filter 87 a previously established measuring value is maintained during the periods $\overline{DCL}$.

The threshold detector 88 can be used additionally for the following purpose. The level of response of threshold detector 88 may be adjusted to, for example 3 volts. If the voltage across the points is below 3 volts the points are regarded as closed, when above the points are open. It often occurs that breaker point resistance is rather high due to oxidation, dirt, etc. which introduces an unwanted resistance into the ignition circuit and lowers the ignition pulse. Thereupon ignition is rendered uncertain.

It will be observed that the amplitudes of the ignition pulses themselves can be observed on the oscilloscope in various ways during the various display modes as described earlier. Now we shall describe how it can be determined whether a low ignition voltage as observed can readily be attributed to a high point resistance.

A second threshold detector 78 determines whether or not the voltage across the breaker points are above or below, for example 3/10 volts. This is again an arbitrary value but found suitable for the present purpose. Too high a resistance is present, when detector 78 detects a voltage above 3/10 for the same time when detector 88 detects a voltage below 3 volts. The particular operating output levels of detectors 88 and 78 are not important when regarded from the standpoint of logic signals. The output of a detector, 78, or 88, is defined to be a "true" signal, when the input voltage as monitored is below the respective adjusted threshold level, and "false" when exceeding the respective threshold. It follows that the condition of high point resistance is established, when the output of detector 88 (response level 3 volts) is true, and when concurrently the output of detector 78 (response level 3/10 volts) is false. A gate 79 monitors this condition and when established an indicator lamp 89 lights up. Lamp 89 will not light up, when the breaker points are open (output of both detectors 88 and 78 are false), or when at low resistance (clean contacts) the breaker points are closed (output of both detectors 88 and 78 are true).

Finally, it is pointed out that by using a separate instrument 90, and coupling it to the SCO monovibrator, one can continuously observe the absolute value of the r.p.m., in regular tachometer type configuration. Alternatively, the voltage CCV can be used as representation for the absolute value of the frequency of the pulses to which the loop has synchronized. Thus, a voltage meter 90* coupled to line 21 can be calibrated to indicate, for example, frequency or r.p.m.

It can thus be seen, that by employing the general principles of the present invention one can provide readily available indications and representations of the status of the ignition circuit of an internal combustion engine. Adjustments can readily be made and conditions be observed during conduction of the several tests. The control element is the sweep generator which establishes in the synchronizing mode a speed independent signal indicative of phase progression after a control or trigger pulse derived from an analog signal. The sweep signal can be established during the constant speed mode with a fixed phase angle added. The sweep signal can be used to control the sweep of an oscilloscope, to drive a strobe lamp, to control a frequency loss meter, or to drive other instruments. A synchronous counter can be used to track the several analog signals to provide selectivity or display or inhibition and to establish further control signals for measurements having relative significance for individual pulses as recurring in a group of selectable number of pulses.

The invention is not limited to the embodiments described above but all changes and modifications thereof not constituting departures from the spirit and scope of the invention are intended to be covered by the following claims.

I claim:

1. In a testing apparatus for multicylinder internal combustion engines, first means for deriving a plurality of trigger signals from the engine at a rate dependent upon the speed of the engine;
   second means responsive to the trigger signals to provide a first signal with a progressively increasing amplitude;
   third means connected to the second means and operable in a closed loop to vary the slope of the first signal for maintaining the amplitude of the first signal constant even with variations in the rate of the trigger signals;
   fourth means operable in an open loop to vary the amplitude of the first signal proportionally with the rate of the trigger signals in relation to the previously established constant value in the amplitude of the first signal; and
   means to provide an indication of the amplitude of the first signal as provided by the fourth means.

2. In the apparatus set forth in claim 1,
   the means providing an indication of the amplitude of the first signal being operative to provide an indication of the average value of the amplitude.

3. In the apparatus set forth in claim 1,
   means responsive to the differences in the amplitude of the first signal as provided by the fourth and third means for providing an indication of the percent change in speed of the engine.

4. In the circuit set forth in claim 1,
   the third means being operative to provide an average amplitude for the sweep signal.

5. In the circuit set forth in claim 1,
   means responsive to the difference between the amplitude of the sweep signal provided by the third means and the particular amplitude for providing an indication of the percent change of speed of the engine.

6. In combination for controlling the sweep rate of a display signal in accordance with a variable rate of recurrence of a sequence of successive phenomena, which are triggering signals for sequentially firing the cylinders on a cyclic basis in a multicylinder engine;
   first electronic means having a first state of operation for providing a signal having first characteristics and having a second state of operation for providing a signal having second characteristics different from the first characteristics;
   second electronic means responsive to each recurrence of a particular one of the successive phenomena for obtaining a triggering of the first electronic means to the first state of operation and for providing the first electronic means in the first state of operation for a controlled period of time less than the time between that occurrence and the next occurrence of the particular one of the successive phenomena;
   third electronic means for triggering the first electronic means to the second state at the end of each controlled period of time;
   fourth electronic means responsive to the operation of the first electronic means in the first and second states for maintaining a particular timed relationship between the operation of the first means in the first and second states regardless of changes in the variable rate of recurrence of the sequence of successive phenomena;
   fifth electronic means for providing a sweep of an oscilloscope beam during the operation of the first means in the first state;
   sixth electronic means associated with the first electronic means to provide a ramp voltage to a particular amplitude during the operation of the first electronic means in the first state;
   the second electronic means being responsive to the production of the ramp voltage of the particular amplitude to institute the operation of the first means in the second state; and
   seventh means for measuring the ramp voltage in each cycle of sequential firing of the multiple number of cylinders, upon the failure of a particular one of the cylinders to fire in each cycle, to indicate the speed of the engine.

7. The combination set forth in claim 6, wherein
   the seventh means are operative to measure the average value of the ramp voltage in each cycle of sequential firing of the multiple number of cylinders, upon the failure of the particular one of the cylinders to fire in each cycle, to indicate the speed of the engine.

8. The combination set forth in claim 6, wherein
   means are responsive to the difference in the ramp voltage measured by the seventh means and the particular amplitude of the ramp voltage for providing an indication of the percent change of speed of the engine.

9. In a testing apparatus for multicylinder internal combustion engines wherein triggering signals are introduced to the different cylinders in the engine to fire the cylinders,
   first means providing first and second modes of operation;
   second means responsive to each of the triggering signals in the first mode of operation of the first means for producing a ramp voltage to a particular amplitude through a period of time less than the time between successive triggering signals but dependent upon the rate of the triggering signals;
   third means responsive to the ramp voltage for producing a sweep of an oscilloscope beam in accordance with the ramp voltage;

fourth means responsive to each of the triggering signals in the second mode of operation of the first means for producing the ramp voltage during the period between the successive triggering signals; and fifth means operative in the second mode for determining the amplitude of the ramp voltage produced by the fourth means.

10. In the testing apparatus set forth in claim 9,
the fifth means being operative to determine the average amplitude of the ramp voltage produced by the fourth means.

11. In the testing apparatus set forth in claim 9,
means responsive to the difference between the amplitude of the ramp voltage produced by the fourth means and the particular amplitude for providing an indication of the percent change of speed of the engine.

12. In the testing apparatus specified in claim 9,
the fifth means being operative to measure the peak amplitude of the voltage produced by the fourth means.

13. In the testing apparatus specified in claim 9,
the fifth means being operative to measure the ratio of the amplitudes of the voltages produced by the fourth and second means.

14. In a testing apparatus for multicylinder internal combustion engines wherein triggering signals are introduced to the different cylinders in the engine to fire the cylinders,
first means providing first and second modes of operation;
second means connected in a closed loop in the first mode of the first means for producing a ramp voltage to a particular amplitude in synchronism with the triggering signals and at a slope dependent upon the rate of the triggering signals;
third means connected in an open loop in the second mode of operation for producing the ramp voltage at the slope previously produced by the second means and for producing the ramp voltage throughout the period between the successive triggering signals to produce a voltage dependent upon such period; and
fourth means operative in the second mode for determining the amplitude of the ramp voltage produced by the third means.

15. In the testing apparatus set forth in claim 14,
the fourth means being operative to measure the peak amplitude of the voltage produced by the third means.

16. In the testing apparatus set forth in claim 14,
the fourth means being operative to measure the ratio of the amplitudes of the voltages produced by the third means and the second means.

17. In the testing apparatus set forth in claim 14,
the fourth means being operative in the second mode for determining the average amplitude of the ramp voltage produced by the third means.

18. In the testing apparatus set forth in claim 14,
means responsive to the difference between the ramp voltage produced by the third means and the particular amplitude for providing an indication of the percent change of speed of the engine.

19. In a testing apparatus for multicylinder internal combustion engines wherein triggering signals are introduced to the different cylinders in the engine to fire the cylinders,
first means providing first and second modes of operation;
second means operative in the first mode of operation for providing a ramp voltage to a particular amplitude in synchronism with triggering signals and with a slope dependent upon the rate of occurrence of the triggering signals;
third means operative in the second mode for providing the ramp voltage throughout the period between the successive triggering signals at the slope provided by the second means; and
fourth means for measuring the ramp voltage in each cycle of sequential firing of the multiple number of cylinders, upon the failure of a particular one of the cylinders to fire in each cycle, to indicate the speed of the engine.

20. In the testing apparatus set forth in claim 19,
the fourth means being operative to measure the average value of the ramp voltage in each cycle of sequential firing of the multiple number of cylinders upon the failure of a particular one of the cylinders to fire in each cycle, to indicate the speed of the engine.

21. In the testing apparatus set forth in claim 19,
means responsive to the difference between the ramp voltage measured by the fourth means and the particular amplitude for providing an indication of the percent change in speed of the engine.

22. In a testing apparatus for multicylinder internal combustion engines wherein triggering signals are introduced to the different cylinders in the engine to fire the cylinders,
first means providing first and second modes of operation;
second means connected in a closed loop in the first mode of the switching means for producing a ramp voltage to a particular amplitude in synchronism with the triggering signals and at a slope dependent upon the rate of the triggering signals;
third means connected in an open loop in the second mode of operation for producing the ramp voltage at the slope previously produced by the second means and for producing the ramp voltage throughout the period between the successive triggering signals to produce a voltage dependent upon such period; and
fourth means for measuring the ramp voltage in each cycle of sequential firing of the multiple number of cylinders, upon the failure of a particular one of the cylinders to fire in each cycle, to indicate the speed of the engine.